(12) United States Patent
Kheil et al.

(10) Patent No.: US 9,315,134 B2
(45) Date of Patent: Apr. 19, 2016

(54) SECURING SEAT TRIM COVERS TO FOAM CUSHIONS

(71) Applicant: Velcro Industries B.V., Willemstad, Curacao (NL)

(72) Inventors: Victor Horst Kheil, Kitchener, CA (US); Earl Lorne Cowley, Ajax, CA (US)

(73) Assignee: Velcro BVBA, Deinze (BE)

( * ) Notice: Subject to any disclaimer, the term of this patent is extended or adjusted under 35 U.S.C. 154(b) by 0 days.

(21) Appl. No.: 14/525,606

(22) Filed: Oct. 28, 2014

(65) Prior Publication Data
US 2015/0130255 A1 May 14, 2015

Related U.S. Application Data

(60) Provisional application No. 61/901,867, filed on Nov. 8, 2013.

(51) Int. Cl.
*A47C 31/02* (2006.01)
*B60N 2/58* (2006.01)
*B60N 2/70* (2006.01)
*B60N 2/72* (2006.01)

(52) U.S. Cl.
CPC ............... *B60N 2/5825* (2013.01); *B60N 2/70* (2013.01); *B60N 2/72* (2013.01); *Y10T 29/49959* (2015.01)

(58) Field of Classification Search
CPC ........... B60N 2/5825; B60N 2/70; B60N 2/72
USPC .......... 297/218.1, 218.2, 218.3, 218.5, 452.6; 24/306, 591.1, 458, 532, 601.2, 343, 24/370, 457, 552, 546
See application file for complete search history.

(56) References Cited

U.S. PATENT DOCUMENTS

| 282,183 | A | * | 7/1883 | Fletcher | A24F 13/22 |
| | | | | | 24/552 X |
| 415,030 | A | * | 11/1889 | Dillard | B60C 27/06 |
| | | | | | 24/598.6 |
| 1,968,168 | A | * | 7/1934 | Place | 52/511 |
| 2,548,838 | A | * | 4/1951 | Gillespie | 24/453 |
| 2,840,898 | A | * | 7/1958 | Yeo | B21F 45/00 |
| | | | | | 24/598.6 |
| 3,333,307 | A | * | 8/1967 | Wheeler | A47G 33/10 |
| | | | | | 24/598.6 |
| 3,633,253 | A | * | 1/1972 | Ellis | A41H 15/00 |
| | | | | | 24/552 |

(Continued)

FOREIGN PATENT DOCUMENTS

DE 29917372 1/2000
FR 2385966 A1 10/1978

(Continued)

OTHER PUBLICATIONS

International Search Report and Written Opinion for PCT/EP2014/073743 mailed Jan. 27, 2015 (10 pp.).

(Continued)

*Primary Examiner* — Rodney B White
(74) *Attorney, Agent, or Firm* — Fish & Richardson P.C.

(57) ABSTRACT

A seat trim cover includes a flexible web and a plurality of molded clips spaced-apart at predetermined intervals along a distal edge of the web. Each of the clips includes a base attached to the web and one or more latch elements extending from the base to a point beyond the distal edge of the web. The latch elements of each clip are configured to clasp a cushion retainer when forced into engagement with the retainer.

28 Claims, 20 Drawing Sheets

(56) References Cited

U.S. PATENT DOCUMENTS

| | | | |
|---|---|---|---|
| 3,705,442 A * | 12/1972 | Sygnator | 24/573.09 |
| 4,576,535 A * | 3/1986 | Howering | 411/503 |
| 5,605,373 A | 2/1997 | Wildern et al. | |
| 5,826,312 A | 10/1998 | Schroder et al. | |
| 6,048,025 A | 4/2000 | Tillner | |
| 6,122,806 A * | 9/2000 | Umezawa | B60N 2/5825 24/546 |
| 6,360,406 B1 * | 3/2002 | Patterson et al. | 24/458 X |
| 6,378,944 B1 * | 4/2002 | Weisser | 297/218.5 X |
| 6,976,737 B1 | 12/2005 | Dandolo | |
| 7,287,305 B2 * | 10/2007 | Bednarski | 297/218.3 X |
| 7,552,516 B2 | 6/2009 | Okada et al. | |
| 7,568,761 B2 * | 8/2009 | Mashimo | 297/218.1 X |
| 7,815,992 B2 | 10/2010 | Pedde et al. | |
| 7,901,002 B2 | 3/2011 | Mashimo | |
| 7,971,325 B2 | 7/2011 | Line et al. | |
| 8,099,837 B2 * | 1/2012 | Santin et al. | 297/218.2 X |
| 8,197,010 B2 * | 6/2012 | Galbreath et al. | 297/452.6 |
| 8,398,174 B2 * | 3/2013 | Hofmann | 297/452.6 |
| 8,522,406 B2 * | 9/2013 | Voigt | 297/452.6 X |
| 8,857,018 B2 * | 10/2014 | Murasaki et al. | 297/218.1 X |
| 9,004,591 B2 * | 4/2015 | Murasaki et al. | 297/218.2 |
| 2002/0101109 A1 | 8/2002 | Stiller et al. | |
| 2003/0162008 A1 | 8/2003 | Cappucci et al. | |
| 2005/0245126 A1 | 11/2005 | Colja et al. | |
| 2010/0314922 A1 * | 12/2010 | Poulakis | 297/218.2 |
| 2012/0187731 A1 * | 7/2012 | Guadagno | 297/218.2 |

FOREIGN PATENT DOCUMENTS

| | | |
|---|---|---|
| WO | WO2005/108842 | 11/2005 |
| WO | WO2009/103417 | 8/2009 |
| WO | WO2011/058415 | 5/2011 |

OTHER PUBLICATIONS

International Preliminary Report on Patentability for International Application No. PCT/EP2014/073743 mailed Nov. 12, 2015 (6 pp).

* cited by examiner

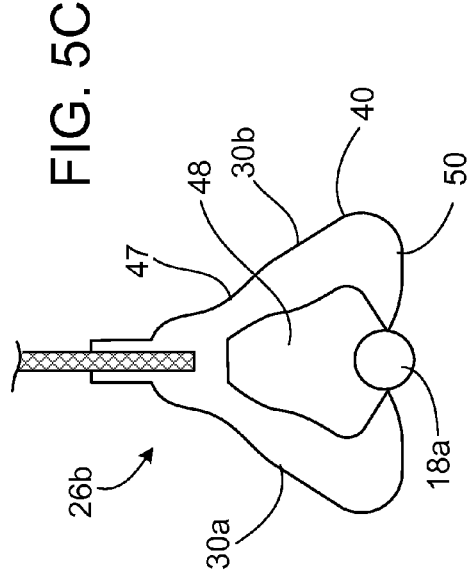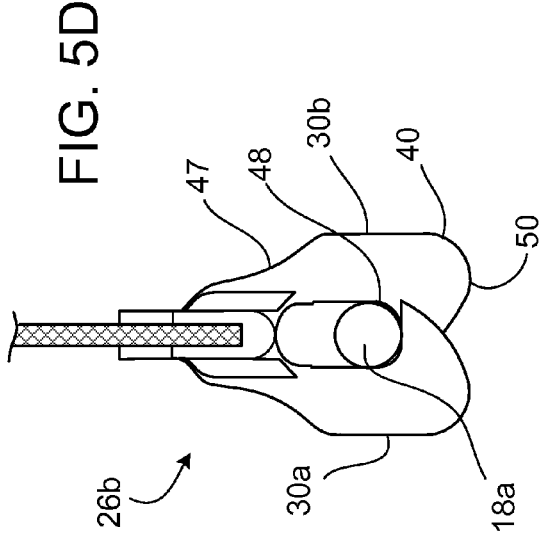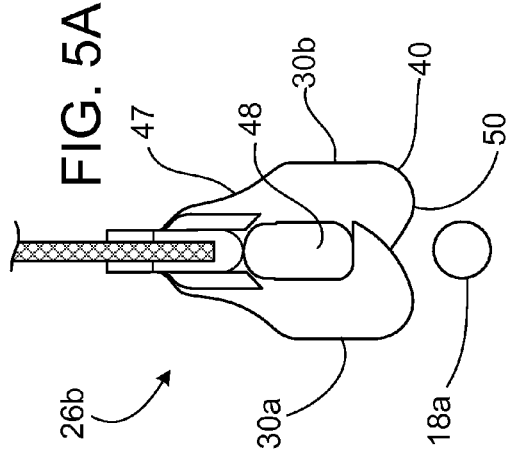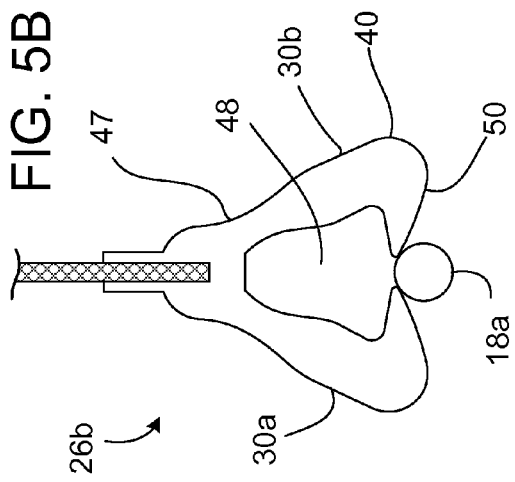

SECURING SEAT TRIM COVERS TO FOAM CUSHIONS

TECHNICAL FIELD

This specification generally relates to securing seat trim covers to foam cushions.

BACKGROUND

Seats for cars and light trucks have been formed by molding a foam bun that will serve as the seat cushion, and then attaching a pre-stitched fabric cover to the foam bun. Often, when the fabric cover is to be held securely to the foam bun along a bun contour, discrete fastenings, such as hog rings, are employed to connect a fabric flange, extending from the inner surface of the cover, to a wire retainer embedded at the bottom of a corresponding trench in the foam bun surface. Tension in the cover flange holds the cover against the bun in the contour. Other fastening methods involve fastening a clip, secured in the trench, to a bead along the flange edge.

Some fastening methods can be very labor-intensive, and can require significant manual dexterity. Some also require pneumatic tools for repetitive installations, due to the force required.

Improvements in the methods of attaching covers to contoured foam products are sought, either for contoured foam seat cushions or other applications.

SUMMARY

This specification describes technologies related to systems, apparatus, and methods for securing seat trim covers to foam cushions In several aspects, the products and methods of the invention feature a plurality of clips spaced-apart at intervals along a distal edge of a web, such as for securing a seat trim cover to a retainer held in a foam seat cushion, with each of the clips having a base permanently molded to, or otherwise secured to, the web, and one or more latch elements extending from the base to a point beyond the distal edge of the web.

One aspect of the invention features a method of securing a seat trim cover to a foam cushion, the method including placing a flexible seat trim cover adjacent a foam bun having a foam body outlined by a contoured outer surface, the foam bun carrying an elongated cushion retainer, and forcing each of a plurality of clips spaced-apart at predetermined intervals along a distal edge of a web of the seat trim cover into engagement with the cushion retainer, thereby simultaneously fastening and aligning the seat trim cover to the foam bun. Each of the plurality of clips includes an opposing set of one or more latch elements located on either side of the web, and the opposing sets of latch elements are positioned offset from one another along a length of the distal edge of the web.

In some examples, the opposing sets of latch elements are offset from one another by a distance less than the predetermined intervals between the clips.

In some cases, the cushion retainer is embedded in the foam bun beneath a floor of an elongated trench defined in the foam body, such that forcing the clips into engagement with the retainer comprises pushing the latch elements beyond the floor of the trench. The cushion retainer may be a continuous cord or wire, for example.

In some embodiments, the clip comprises two bases, each base secured to and extending from a respective side of the web and carrying at least one of the latch elements. In some arrangements, the bases are offset from one another along the length of the web. In some cases the bases are offset from one another by a distance in a direction perpendicular to the distal edge of the web. The bases may be positioned in a non-overlapping manner with respect to a plane of the web, such as with respect to position along the length of the web, such that forcing the clips into engagement with the retainer comprises inducing a twist in the web.

The retainer may be secured within an elongated trench defined in the foam body and have a longitudinally continuous rail with a bulbous distal edge, such that forcing the clips into engagement with the retainer involves forcing the latch elements over the bulbous distal edge of the rail.

A first of the latch elements, in some examples, has a base attached to a first side of the web, a neck extending from the base to beyond the distal edge of the web, and a head protruding from the neck toward a second side of the web. In some cases, the head terminates in a non-reentrant tip. In some other cases, the head terminates in a reentrant tip. The base may be over-molded onto the web. The head may have a tapered cam surface at its distal edge, such as to help align the latch element and laterally deflect the latch element under pressure against the retainer.

A second of the latch elements, in some examples, has a second base attached the second side of the web, a second neck extending from the second base to beyond the distal edge of the web, and a second head protruding from the second neck toward the first side of the web. A portion of the head of the first latch element may overlap a portion of the second head to define a closed groove for clasping the retainer, such that forcing the clips into engagement separates the latch elements to receive the retainer. In some cases, the base of the first latch element and the second base together form a unitary mass of resin, such as by being molded contiguously.

In some other cases, a second of the latch elements has a second base attached the second side of the web, and a second neck with a flat inner surface extending from the second base to beyond the distal edge of the web to oppose the head of the first of the latch elements.

The opposing sets of latch elements preferably cooperate to define a closed groove for clasping the retainer, such that forcing the clips into engagement separates the latch elements to receive the retainer.

In some cases, the latch elements of the opposing set overlap across a plane of the web, such that forcing the clips into engagement separates the latch elements to receive the retainer.

The opposing sets of latch elements may include substantially mirror-image latch elements on either side of the web, for example.

In some examples, the web also has a listing bead reinforcing its distal edge, the listing bead including solidified resin material over-molded along the distal edge of the web between spaced apart clips.

In some examples, at least one of the latch elements defines a hole having an edge from which an angled flap of the latch element extends across a plane of the web, such that forcing the clips into engagement with the retainer involves forcing the angled flap against the retainer.

A related aspect of the invention features a covered foam cushion including a foam bun having a foam body and a contoured surface outlining the foam body, an elongated cushion retainer permanently secured to the foam bun, and a seat trim cover secured to at least a portion of the foam bun. The seat trim cover has a flexible web and a plurality of clips spaced-apart at predetermined intervals along a distal edge of the web. Each of the clips includes an opposing set of one or more latch elements located on either side of the web, the opposing sets of latch elements being positioned offset from one another along a length of the distal edge of the web. The latch elements of each clip clasp the cushion retainer at discrete sections along its length.

In some cases, the opposing sets of latch elements are offset from one another by a distance less than the predetermined intervals between the clips.

The cushion retainer may be embedded in the foam bun beneath a floor of an elongated trench defined by the foam body, and may be in the form of a continuous cord or wire, for example.

In some examples, each of the clips has two bases, each base secured to and extending from a respective side of the web and carrying at least one of the latch elements. The bases may be offset from one another along the length of the web, and/or by a distance in a direction perpendicular to the distal edge of the web. The bases define an overall length of each clip along the distal edge of the web, and the ratio of clip spacing interval to clip length is preferably between about 2:1 and 8:1. In some examples the bases are positioned in a non-overlapping manner with respect to a plane of the web, such as with respect to position along the length of the web.

In some embodiments the retainer is secured within an elongated trench defined in the foam body and includes a longitudinally continuous rail with a bulbous distal edge.

A first of the latch elements, in some examples, has a base attached to a first side of the web, a neck extending from the base to beyond the distal edge of the web, and a head protruding from the neck toward a second side of the web. In some cases, the head terminates in a non-reentrant tip. In some other cases, the head terminates in a reentrant tip. The base may be over-molded onto the web. The head may have a tapered cam surface at its distal edge, such as to help align the latch element and laterally deflect the latch element under pressure against the retainer.

A second of the latch elements, in some examples, has a second base attached the second side of the web, a second neck extending from the second base to beyond the distal edge of the web, and a second head protruding from the second neck toward the first side of the web. A portion of the head of the first latch element may overlap a portion of the second head to define a closed groove for clasping the retainer, such that forcing the clips into engagement separates the latch elements to receive the retainer. In some cases, the base of the first latch element and the second base together form a unitary mass of resin, such as by being molded contiguously.

In some other cases, a second of the latch elements has a second base attached the second side of the web, and a second neck with a flat inner surface extending from the second base to beyond the distal edge of the web to oppose the head of the first of the latch elements.

As noted above, the opposing sets of latch elements may include substantially mirror-image latch elements on either side of the web, the web may also have a listing bead reinforcing its distal edge (such as a listing bead including solidified resin material over-molded along the distal edge of the web between spaced apart clips), and at least one of the latch elements may define a hole having an edge from which an angled flap of the latch element extends across a plane of the web.

Another aspect of the invention features a seat trim cover having a flexible web and a plurality of clips spaced-apart at predetermined intervals along a distal edge of the web. Each of the clips includes an opposing set of one or more latch elements located on either side of the web, the opposing sets of latch elements being positioned offset from one another along a length of the distal edge of the web. The latch elements of each clip are configured to clasp a cushion retainer, such as a retainer in the form of an elongated cord or wire, or elongated bulbous head, when forced into engagement with the retainer.

In some cases, the opposing sets of latch elements are offset from one another by a distance less than the predetermined intervals between the clips.

In some examples, each of the clips has two bases, each base secured to and extending from a respective side of the web and carrying at least one of the latch elements. The bases may be offset from one another along the length of the web, and/or by a distance in a direction perpendicular to the distal edge of the web. The bases define an overall length of each clip along the distal edge of the web, and the ratio of clip spacing interval to clip length is preferably between about 2:1 and 8:1. In some examples the bases are positioned in a non-overlapping manner with respect to a plane of the web, such as with respect to position along the length of the web.

As noted above, in some examples a first of the latch elements, in some examples, has a base attached to a first side of the web, a neck extending from the base to beyond the distal edge of the web, and a head protruding from the neck toward a second side of the web. In some cases, the head terminates in a non-reentrant tip. In some other cases, the head terminates in a reentrant tip. The base may be over-molded onto the web. The head may have a tapered cam surface at its distal edge, such as to help align the latch element and laterally deflect the latch element under pressure against the retainer.

A second of the latch elements, in some examples, has a second base attached the second side of the web, a second neck extending from the second base to beyond the distal edge of the web, and a second head protruding from the second neck toward the first side of the web. A portion of the head of the first latch element may overlap a portion of the second head to define a closed groove for clasping the retainer, such that forcing the clips into engagement separates the latch elements to receive the retainer. In some cases, the base of the first latch element and the second base together form a unitary mass of resin, such as by being molded contiguously.

In some other cases, a second of the latch elements has a second base attached the second side of the web, and a second neck with a flat inner surface extending from the second base to beyond the distal edge of the web to oppose the head of the first of the latch elements.

As noted above, the opposing sets of latch elements may include substantially mirror-image latch elements on either side of the web, the web may also have a listing bead reinforcing its distal edge (such as a listing bead including solidified resin material over-molded along the distal edge of the web between spaced apart clips), and at least one of the latch elements may define a hole having an edge from which an angled flap of the latch element extends across a plane of the web.

Another aspect of the invention features a method of securing a seat trim cover to a foam cushion, with the method including placing a flexible seat trim cover adjacent a foam bun having a foam body outlined by a contoured outer surface, the foam bun carrying an elongated cushion retainer, and forcing each of a plurality of clips spaced-apart at predetermined intervals along a distal edge of a web of the cover into engagement with the with the cushion retainer, thereby simultaneously fastening and aligning the seat trim cover to the foam bun. Each of the plurality of clips has a base permanently molded to the web, and one or more latch elements extending contiguously from the base to a point beyond the distal edge of the web.

In some examples, the cushion retainer is embedded in the foam bun beneath a floor of an elongated trench defined in the foam body, such that forcing the clips into engagement with the retainer involves pushing the latch elements beyond the floor of the trench. The cushion retainer may be a continuous cord or wire, for example.

In some arrangements, the base includes a first base molded to a first side of the web, and each of the clips includes a second base molded to a second side of the web, with one or more latch elements extending contiguously from the second base to a point beyond the distal edge of the web.

In many examples, the bases are advantageously offset from one another by a distance along the length of the web, such as a distance less than the predetermined intervals between the clips. The bases may be offset from one another by a distance in a direction perpendicular to the distal edge of the web, and/or may be positioned in a non-overlapping manner with respect to a plane of the web, such that forcing the clips into engagement with the retainer comprises inducing a twist in the web. For example, the bases may be positioned in a non-overlapping manner with respect to position along the length of the web.

In some examples, the latch elements extending from the first base cooperate with the latch elements extending from the second base to define a closed groove for clasping the retainer, such that forcing the clips into engagement separates the latch elements to receive the retainer.

In some examples, the retainer is secured within an elongated trench defined in the foam body and includes a longitudinally continuous rail with a bulbous distal edge, such that forcing the clips into engagement with the retainer involves forcing the latch elements against the bulbous distal edge of the rail.

Each of the clips may include an opposing set of one or more latch elements located on either side of the web, and the base may be a unitary mass of resin over-molded on both sides of the web, such that forcing the clips into engagement with the retainer causes the latch elements to bend outwardly away from a plane of the web to receive the retainer. The latch elements may feature a flex point to facilitate outward bending away from the plane of the web.

As noted above, in some examples a first of the latch elements, in some examples, has a base attached to a first side of the web, a neck extending from the base to beyond the distal edge of the web, and a head protruding from the neck toward a second side of the web. In some cases, the head terminates in a non-reentrant tip. In some other cases, the head terminates in a reentrant tip. The base may be over-molded onto the web. The head may have a tapered cam surface at its distal edge, such as to help align the latch element and laterally deflect the latch element under pressure against the retainer.

A second of the latch elements, in some examples, has a second base attached the second side of the web, a second neck extending from the second base to beyond the distal edge of the web, and a second head protruding from the second neck toward the first side of the web. A portion of the head of the first latch element may overlap a portion of the second head to define a closed groove for clasping the retainer, such that forcing the clips into engagement separates the latch elements to receive the retainer. In some cases, the base of the first latch element and the second base together form a unitary mass of resin, such as by being molded contiguously.

In some other cases, a second of the latch elements has a second base attached the second side of the web, and a second neck with a flat inner surface extending from the second base to beyond the distal edge of the web to oppose the head of the first of the latch elements.

As noted above, the opposing sets of latch elements may include substantially mirror-image latch elements on either side of the web, the web may also have a listing bead reinforcing its distal edge (such as a listing bead including solidified resin material over-molded along the distal edge of the web between spaced apart clips), and at least one of the latch elements may define a hole having an edge from which an angled flap of the latch element extends across a plane of the web.

In many cases, the first and second latch elements overlap across a plane of the web, even if offset from one another along a length of the distal edge of the web, such that forcing the clips into engagement separates the latch elements to receive the retainer.

Another aspect of the invention features a covered foam cushion with a foam bun having a foam body and a contoured surface outlining the foam body, an elongated cushion retainer permanently secured to the foam bun and a seat trim cover secured to at least a portion of the foam bun. The seat trim cover includes a flexible web and a plurality of discrete molded clips spaced-apart at predetermined intervals along a distal edge of the web. Each of the clips has a base permanently molded to the web, and one or more latch elements extending contiguously from the base to a point beyond the distal edge of the web. One or more latch elements of each clip clasp the cushion retainer at discrete sections along its length, so as to hold the cover on the cushion.

In some cases, the opposing sets of latch elements are offset from one another along the length of the web by a distance less than the predetermined intervals between the clips.

The cushion retainer may be embedded in the foam bun beneath a floor of an elongated trench defined by the foam body, and may be in the form of a continuous cord or wire, for example.

In some examples, each of the clips has two bases, each base secured to and extending from a respective side of the web and carrying at least one of the latch elements. The bases may be offset from one another along the length of the web, and/or by a distance in a direction perpendicular to the distal edge of the web. The bases define an overall length of each clip along the distal edge of the web, and the ratio of clip spacing interval to clip length is preferably between about 2:1 and 8:1. In some examples the bases are positioned in a non-overlapping manner with respect to a plane of the web, such as with respect to position along the length of the web.

In some embodiments the retainer is secured within an elongated trench defined in the foam body and includes a longitudinally continuous rail with a bulbous distal edge.

A first of the latch elements, in some examples, has a base attached to a first side of the web, a neck extending from the base to beyond the distal edge of the web, and a head protruding from the neck toward a second side of the web. In some cases, the head terminates in a non-reentrant tip. In some other cases, the head terminates in a reentrant tip. The base may be over-molded onto the web. The head may have a tapered cam surface at its distal edge, such as to help align the latch element and laterally deflect the latch element under pressure against the retainer.

A second of the latch elements, in some examples, has a second base attached the second side of the web, a second neck extending from the second base to beyond the distal edge of the web, and a second head protruding from the second neck toward the first side of the web. A portion of the head of the first latch element may overlap a portion of the second head to define a closed groove for clasping the retainer, such that forcing the clips into engagement separates the latch elements to receive the retainer. In some cases, the base of the first latch element and the second base together form a unitary mass of resin, such as by being molded contiguously.

In some other cases, a second of the latch elements has a second base attached the second side of the web, and a second neck with a flat inner surface extending from the second base to beyond the distal edge of the web to oppose the head of the first of the latch elements.

As noted above, the opposing sets of latch elements may include substantially mirror-image latch elements on either side of the web, the web may also have a listing bead reinforcing its distal edge (such as a listing bead including solidified resin material over-molded along the distal edge of the web between spaced apart clips), and at least one of the latch elements may define a hole having an edge from which an angled flap of the latch element extends across a plane of the web.

Yet another aspect of the invention features a seat trim cover with a flexible web and a plurality of molded clips spaced-apart at predetermined intervals along a distal edge of the web. Each of the clips includes a base permanently molded to the web, and one or more latch elements extending contiguously from the base to a point beyond the distal edge of the web. The latch element(s) of each clip are configured to clasp a cushion retainer, such as a continuous cord or wire or an elongated bulbous head, when forced into engagement with the retainer.

The optional features noted above with respect to other seat trim covers of the invention are also applicable to various examples of this seat trim cover.

Yet another aspect of the invention features another method of securing a seat trim cover to a foam cushion, this method also including placing a flexible seat trim cover adjacent a foam bun having a foam body outlined by a contoured outer surface, the foam bun carrying an elongated cushion retainer, and forcing each of a plurality of clips spaced-apart at predetermined intervals along a distal edge of a web of the cover into engagement with the with the cushion retainer, thereby simultaneously fastening and aligning the seat trim cover to the foam bun. Each of the plurality of clips has a first set of one or more latch elements extending contiguously from one or more bases attached to a first side of the web, and a second set of one or more latch elements extending contiguously from one or more bases attached to a second side of the web. The one or more bases attached to the first side of the web are spaced-apart on the web from the one or more bases attached to the second side of the web, forming a non-overlapping arrangement.

In some cases, the bases attached the first side of the web are spaced-apart on the web from the bases attached to the second side of the web by a distance along the length of the web.

In some examples the cushion retainer is embedded in the foam bun beneath a floor of an elongated trench defined in the foam body, such that forcing the clips into engagement with the retainer involves pushing the latch elements beyond the floor of the trench. The cushion retainer may be a continuous cord or wire, for example.

In some cases the retainer is secured within an elongated trench defined in the foam body and has a longitudinally continuous rail with a bulbous distal edge, such that forcing the clips into engagement with the retainer involves forcing the latch elements over the bulbous distal edge of the rail.

The optional features noted above with respect to other seat trim cover securing methods of the invention are also applicable to various examples of this method.

Yet another aspect of the invention features a covered foam cushion with a foam bun having a foam body and a contoured surface outlining the foam body, an elongated cushion retainer permanently secured to the foam bun, and a seat trim cover secured to at least a portion of the foam bun. The cover includes a flexible web and a plurality of clips spaced-apart at predetermined intervals along a distal edge of the web. Each of the clips includes a first set of one or more latch elements extending contiguously from one or more bases attached to a first side of the web, and a second set of one or more latch elements extending contiguously from one or more bases attached to a second side of the web. The one or more bases attached to the first side of the web are spaced-apart on the web from the one or more bases attached to a second side of the web, forming a non-overlapping arrangement, and wherein the latch elements of each clip clasp the cushion retainer at discrete sections along its length.

The optional features noted above with respect to other covered foam cushions of the invention are also applicable to various examples of this cushion.

Yet another aspect of the invention features a seat trim cover with a flexible web and a plurality of clips spaced-apart at predetermined intervals along a distal edge of the web. Each of the clips includes a first set of one or more latch elements extending contiguously from one or more bases attached to a first side of the web, and a second set of one or more latch elements extending contiguously from one or more bases attached to a second side of the web. The one or more bases attached to the first side of the web are spaced-apart on the web from the one or more bases attached to a second side of the web, forming a non-overlapping arrangement, and the latch elements of each clip are configured to clasp a cushion retainer, such as a continuous cord or wire or an elongated bulbous head, when forced into engagement with the retainer.

The optional features noted above with respect to other seat trim covers of the invention are also applicable to various examples of this seat trim cover.

Various implementations of the invention can provide a means for quickly and effectively securing a cover to a foam cushion, in many instances by rapid manual pressure applied to discrete, spaced-apart clips without the need of tools. The clips can be designed to be engaged blindly (that is, without a line of sight to the clip) and without significant dexterity. The clips can be formed inexpensively along an edge of a web of the cover, such as by over-molding processes, and can be configured in an advantageous offset arrangement to ease installation while promoting retention of a cushion retainer once engaged.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-5D are progressive side views illustrating installation of the seat trim cover of FIG. 4A.

Many of the features are exaggerated to better show the features, process steps, and results. Like reference numbers and designations in the various drawings indicate like elements.

DETAILED DESCRIPTION

Figure 1A:
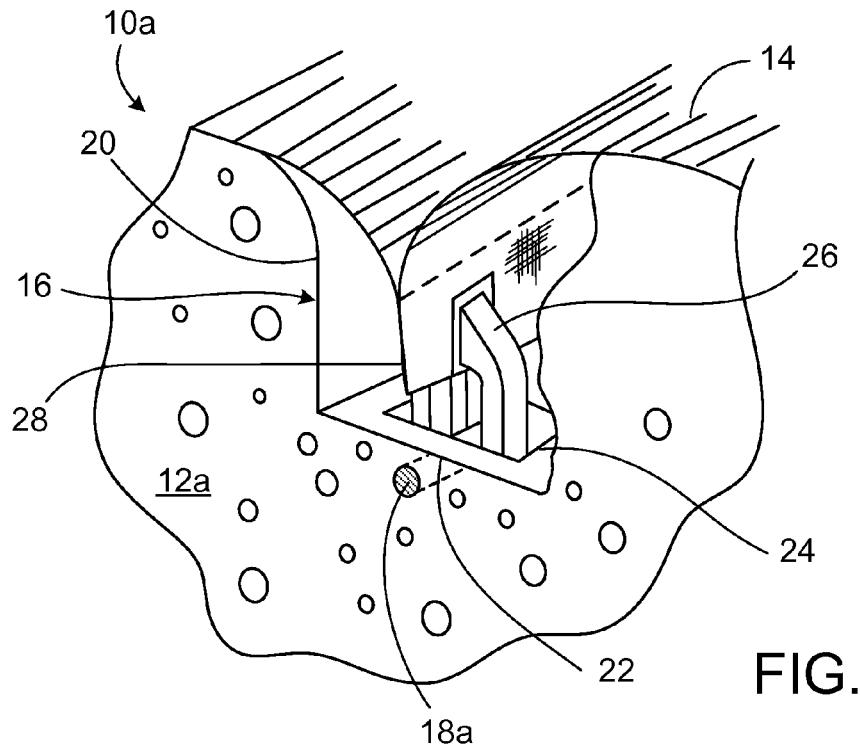
FIG. 1A is a partial cutaway view of a portion of a covered foam seat cushion having an embedded retainer.

Referring first to FIG. 1A, a covered foam cushion 10*a* includes a foam bun 12*a* and a cover 14 extending over a contoured outer surface of the foam bun. The bun surface features an elongated trench 16 at which the cover 14 is held in place by a retainer 18*a*. In this example, retainer 18*a* is a metal wire embedded in the body of foam bun 12*a* beneath trench 16. Trench 16 is defined by two opposing side walls 20 and a floor 22 spanning the distance between the side walls. In this example, the opposing trench side walls are parallel with each other and perpendicular to the trench floor. However, other trench geometries are also envisioned and compatible with the concepts discussed herein. The trench is positioned with respect to the bun contour such that holding the cover tight against the bun at the trench helps to hold the cover tight against the rest of the contour of the foam bun. In this example, the foam cushion is designed for an automotive seat. However, the concepts described in the present disclosure are not so limited, and are suitable for various other applications.

Retainer 18*a* is exposed to the open area of trench 16 along a series of spaced-apart openings 24 along the trench floor 22. A series of discrete clips 26 cooperate with retainer 18*a* to secure cover 14 to foam bun 12*a*. Clips 26 are secured to a flexible web (or "flange") 28 of cover 14 extending down into trench 16. Clips 26 extend beyond a distal edge of the flange and are aligned with openings 24, through which the clips extend to clip onto retainer 18*a*. As described below, the clips feature an opposing set of one or more latch elements located on either side of the cover flange. The opposing sets of latch elements are positioned offset from one another along a length of the distal edge of the flange.

As noted above and shown in the figures, the clips described herein are provided as a series of discrete clips spaced-apart along the length of the cover flange. In many examples, each clip in the series is substantially identical in size and shape to the other clips in the series. However, it is appreciated that some applications may feature different types of clips. The spacing of the clips helps to maintain the flexibility of the flange, such as for following a curved trench in the foam bun. The clips are of an appropriate size and shape to be easily manipulated manually by a human installer. For example, the clips may be spaced along the flange with a spacing of about 50 to 200 mm between neighboring clips, with each clip having an overall length of about 10 to 30 mm in the same direction. The ratio of clip spacing to clip length is determined so as to provide a reasonably continuous connection between the cover and the foam bun, resulting in a smooth seam line, while maintaining flexibility in the flange. In some examples, the ratio of clip spacing to clip length is between 2:1 and 8:1. The number of clips and the length interval gap between clips can vary between different applications. As a practical consideration, when the retainer is embedded in the foam bun below the trench, the placement of the clips should match the spacing of the openings that expose the retainer. In some cases the clips are sufficiently stiff to be pushed into the foam to clip about the retainer, in the absence of any opening.

Figure 1B:
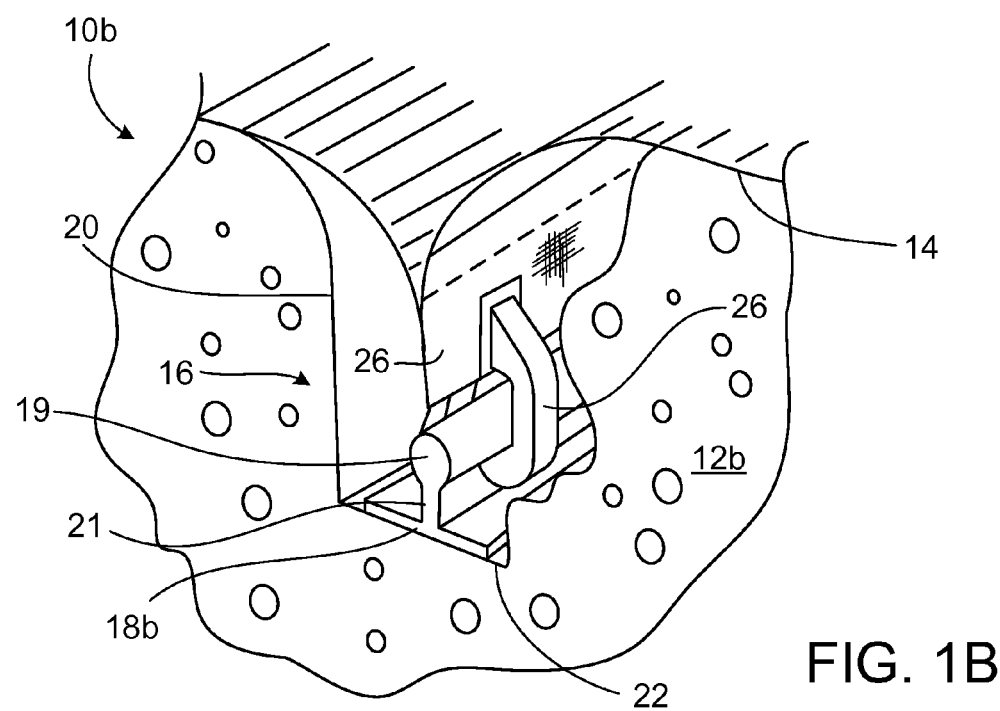
FIG. 1B is a partial cutaway view of a portion of a covered foam seat cushion having a molded bead retainer.

FIG. 1B shows a covered foam cushion 10*b* similar to the foam cushion 10*a*, including a foam bun 12*b* and a cover 14. In this example, the cover 14 is held in place by a retainer 18*b* permanently secured to foam bun 12*b* along the floor 22 of trench 16 and extending upward from the trench floor. Retainer 18*b* features a bulbous head 19 extending along the trench, supported on a narrow stem 21 and disposed between the trench side walls. The latch elements of clips 26 are secured about the head of the retainer.

While retainer 18*b* may be secured within trench 16 by any number of suitable methods, one method understood in the art is to secure the retainer to the foam as the foam is formed, such as by insert-molding the retainer in place. Such methods are described, for example, U.S. Pat. No. 7,971,325. The secured retainer may be, for example, partially embedded in foam of the seat bun, and may include projections (not shown) extending below the surface of the foam. To aid in holding the retainer in place during foaming, the retainer may include a magnetically attractable element, such as a magnetically attractable wire (not shown) extending along its length, to hold the retainer in place by a magnet embedded in a mold in which the foam bun is formed.

Referring next to FIGS. 2A-2D, a seat trim cover 14a features a first example clip 26a including a pair of opposing latch elements 30. Each of the latch elements is supported on a respective base 32a over-molded onto the distal edge 34 of the cover flange 28. The rigid molded bases are spaced-apart from one another along the length of the flexible cover flange by a distance "d", forming a non-overlapping arrangement and offsetting the latch elements (see FIG. 2A). The material of the cover flange between the opposing latch elements makes the clip flexible, allowing for an easier installation process and helping to mitigate stress on the latch elements during installation.

In this example, each of latch elements 30 includes a stem 36 extending integrally outward (away from the side of the flange) and downward from the supporting base 32a beyond the flange edge, a neck 38 extending integrally downward from the stem, and a crescent-shaped head 40 extending integrally from the neck to define an inward cam surface 46. The heads of the opposing latch elements face one another across the flange. As shown, head 40 extends inward (toward the flange) and tapers to a distal tip 44 on the side of the flange opposite from the base, crossing the head of the opposing latch element (see FIG. 2B). As shown, the distal tip of the head faces straight inward toward to the opposing latch element, without an undercut. We describe latch elements exhibiting heads of this shape as having "non-reentrant tips." Thus, cam surfaces 46 of the opposing latch elements 30 cooperate to define a closed groove 48 in side profile for securely clasping the mating retainer 18a (see FIGS. 2C and 2D). As described below, a tapered engagement side 50 of the cam surface along the crown of the latch head 40 can help with installation of the clip 26a onto the wire retainer 18a.

Figure 2A:
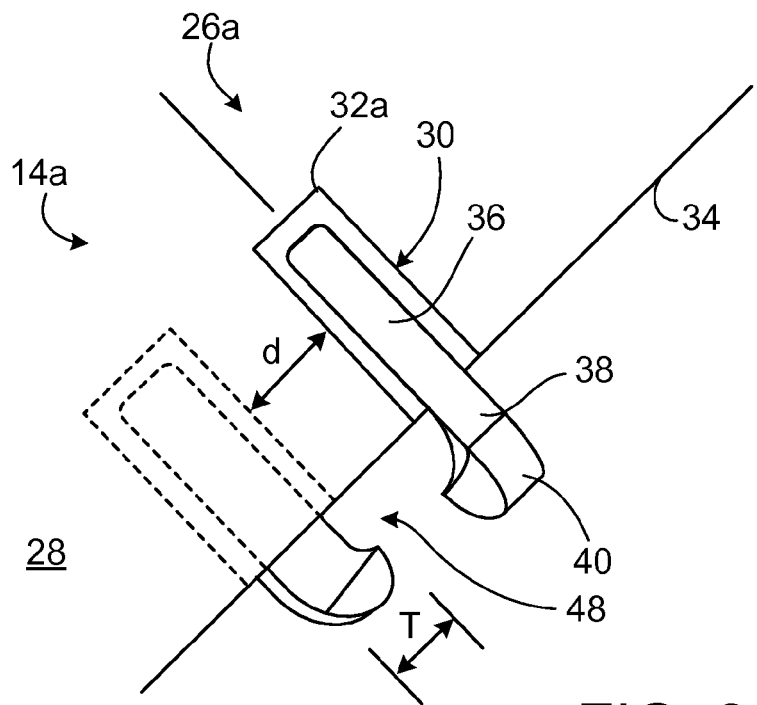
FIG. 2A is perspective view of an edge of a flexible web of a seat trim cover, showing a first clip configuration.
Figure 2B:
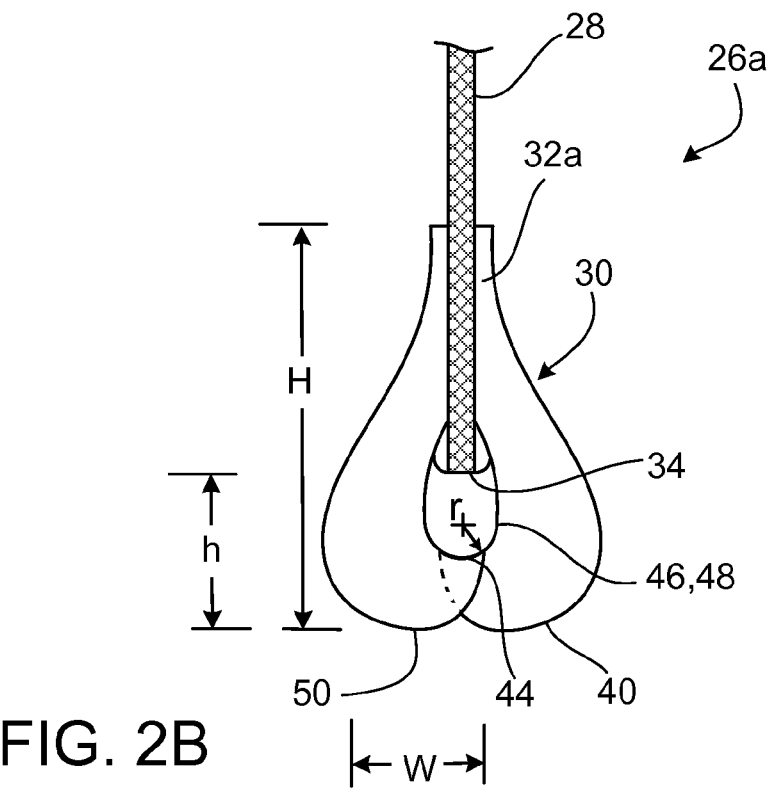
FIG. 2B is an end view of the flexible web edge of FIG. 2A.
Figure 2C:
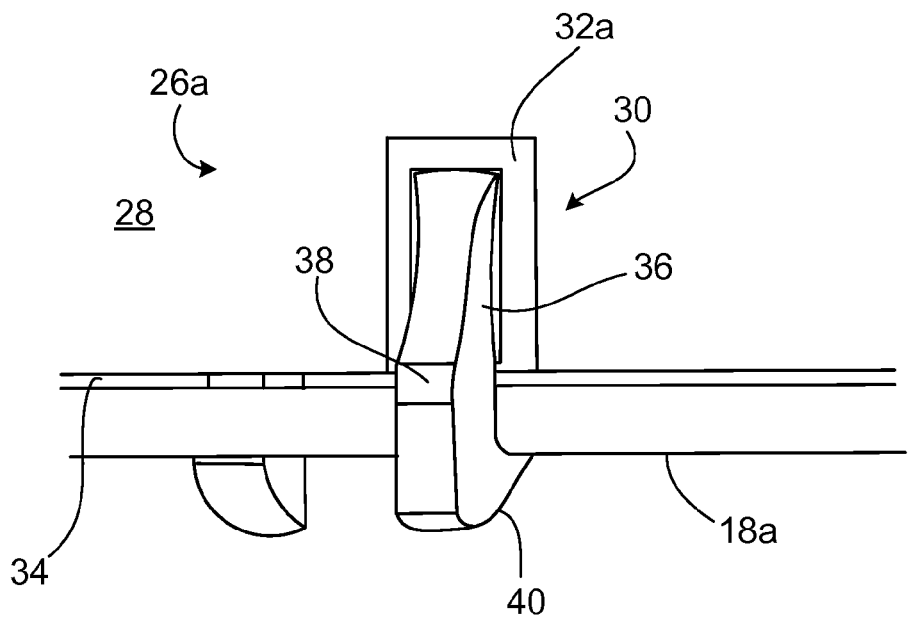
FIG. 2C shows the flexible web of FIG. 2A coupled to a retainer.
Figure 2D:
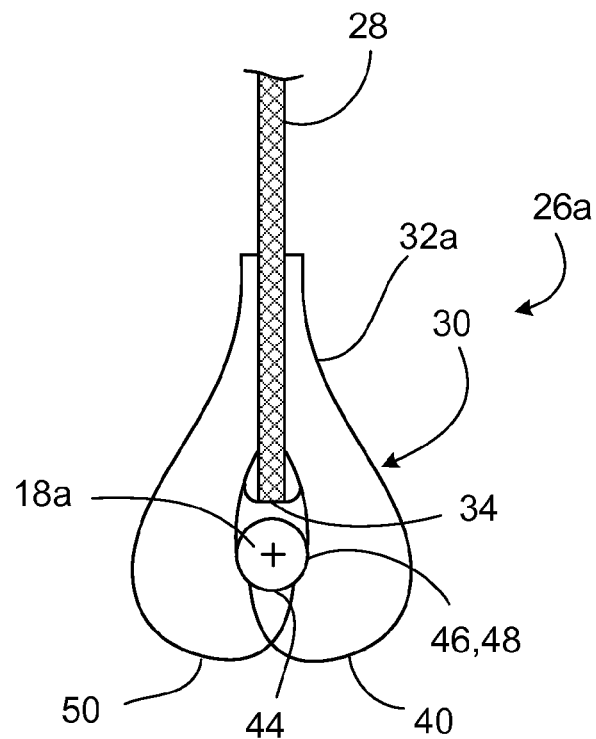
FIG. 2D is an end view of the coupled web of FIG. 2C.

As dimensioned in FIGS. 2A and 2B, latch elements 30 have a width "W" (in this example about six mm), a height "H" (about eighteen mm in this example), and a thickness "T" (about three mm in this example). Latch elements 30 extend beyond the edge of the flange by a distance "h" (about eight mm in this example). The cam surfaces 46 of latch elements 30 have a radius of curvature "r" (about two mm in this example). The cam surfaces of the latch elements are shaped and dimensioned to accommodate the retainer. In some examples, the cam surfaces are dimensioned to tightly clasp the retainer. So, for example, the radius of curvature "r" may be substantially equal to a diameter of the wire retainer, or the lateral spacing between inner surfaces spanning groove 48 may be substantially equal to the diameter of the wire to be retained. The specific dimensions and spacing of the latch elements should be selected in consideration of the flexibility of the web and the retainer to which the latch elements are to be clipped.

The latch elements described herein may be formed of a durable thermoplastic resin, and may be formed by molding them directly onto the opposite sides of a fabric flange. As one example, an injection molding process can be used to mold the latch elements to the flange. The injection molding process and apparatus may resemble those used to manufacture plastic zipper tape. In this case, the distal edge of the flange is inserted into a mold cavity defining the negative shape of one or more latch elements, the mold cavity is sealed, and molten thermoplastic resin is injected through an injection pipe into the sealed mold cavity. The flange is released from the mold cavity once the resin has at least partially solidified and is able to hold the molded shape of the latch elements. The resin may be relatively stiff so as to securely clasp the retainer to hold the seat trim cover in place. Examples of resins from which the latch elements can be formed include polypropylene (PP), polyamide (PA), polybutylene teraphthalate (PBT), polycarbonate/acrylonitrile butadiene styrene (PC/ABS), polyoxymethylene (POM) or filled versions of these thermoplastics (e.g., talc-filled, glass-filled, etc.).

Figure 3A:
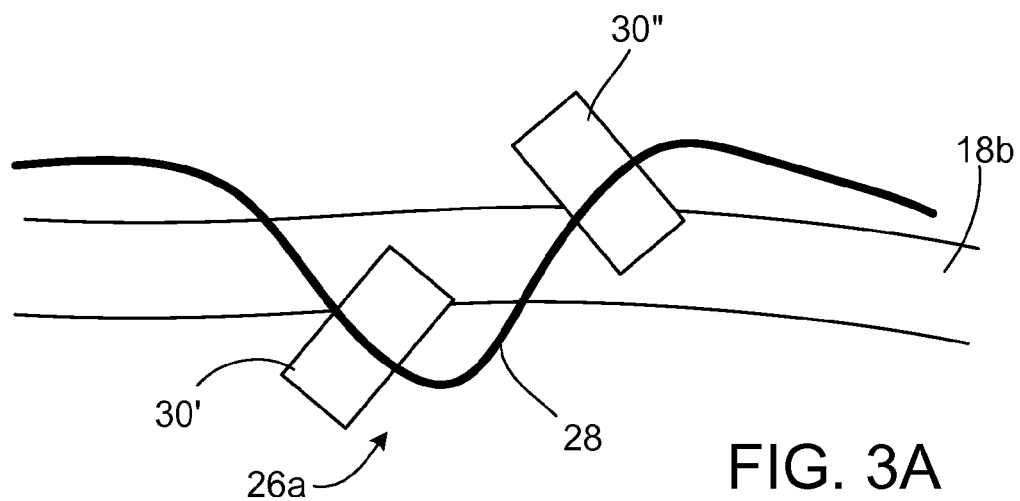
FIGS. 3A and 3B are progressive top views illustrating installation of a seat trim cover.
Figure 3B:
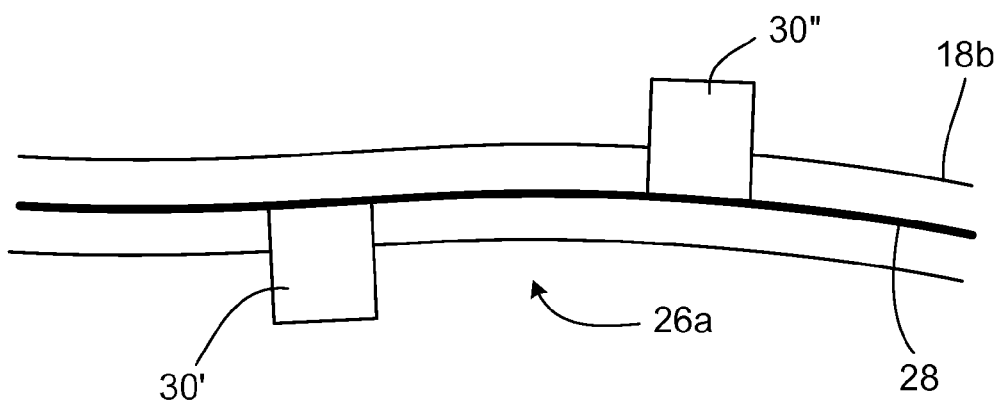

FIGS. 3A and 3B illustrate an example process for installing clip 26a on retainer 18b. In this example, the latch elements 30' and 30" are splayed away from each other, by bending the flange between them as shown in FIG. 3A, and also flexed away from the plane of the centerline of the flange by flexure of the flange at their individual bases, to allow the latch element heads to pass over retainer 18b without significant bending of the retainer. Alternative, a first of the latch elements 30' may be held in place against retainer 18b, with the retainer resting in the recess of the head of the latch element, while a second of the latch elements 30" is maneuvered into place by flexing the flange material between the latch elements. The flexibility of the flange web material enables significant relative motion between the two latch elements, such that elastic flexure of the resin elements themselves is not required for installation. Thus, the latch elements in such a spaced-apart, two-element arrangement can be designed to be relatively rigid.

Figure 3C:
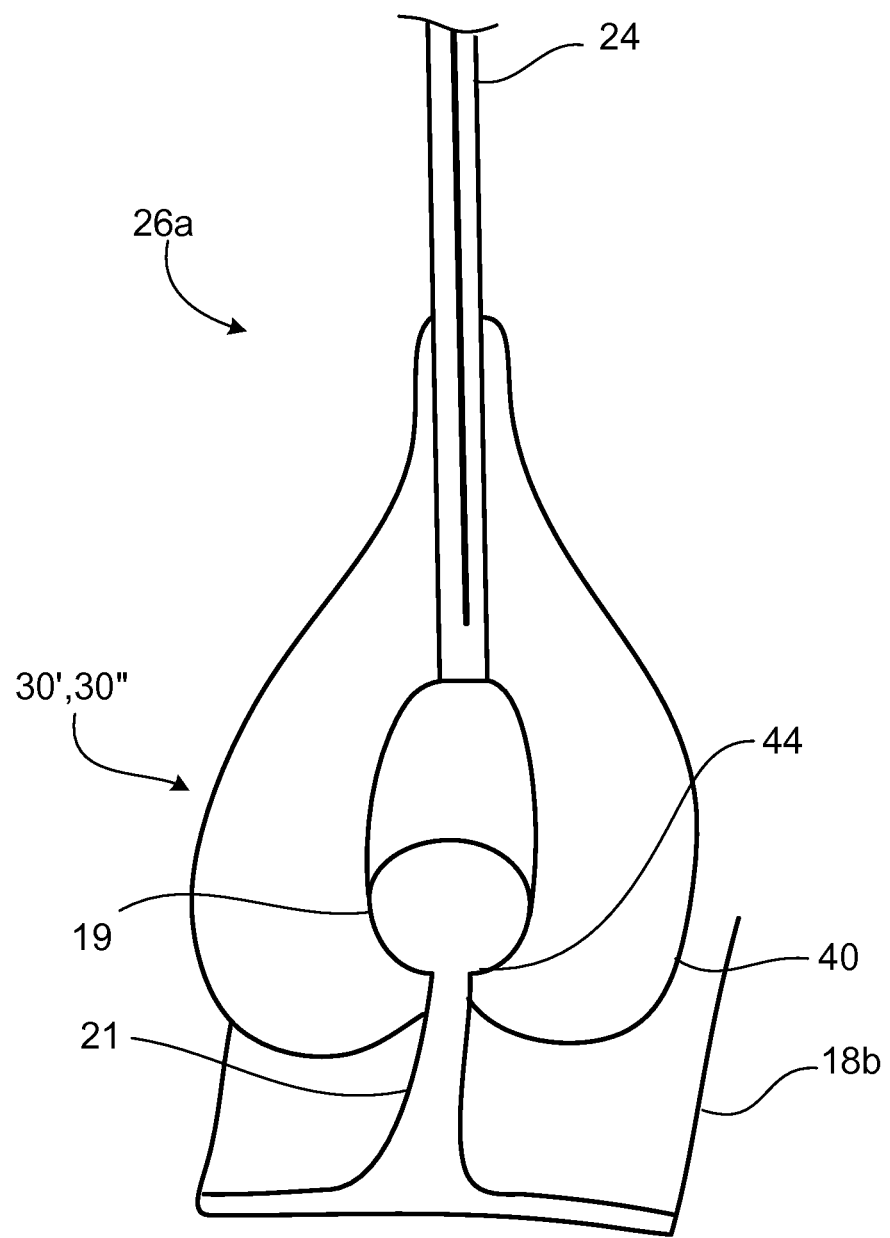
FIG. 3C is an end view of the installed seat trim cover of FIGS. 3A and 3B.

Turning now to FIG. 3C, it is shown that the latch elements 30' and 30" are designed to accommodate the bulbous head 19 and narrow stem 21 of retainer 18b. Thus, the crescent-shaped heads 40 of latch elements 30' and 30" define an inner surface that matches the contour along the underside of the retainer head 19, with the tips 44 of the latch element heads 40 bearing against the retainer stem 21. In this example, the latch elements may be formed from a resin that is particularly stiff to prevent an inadvertent disconnect of the latch elements from the retainer. The stiffer resin may be warranted in this case because the retainer is not secured entirely within a closed groove created by the latch elements, as is the case in the example of FIGS. 2A-2D. Instead, latch elements 30' and 30" define a narrow opening between them to accommodate the stem 21 of retainer 18b. As such, inadvertent release of the latch elements from the retainer may be more likely, unless the retainer is tightly grasped by the latch elements.

Figure 4A:
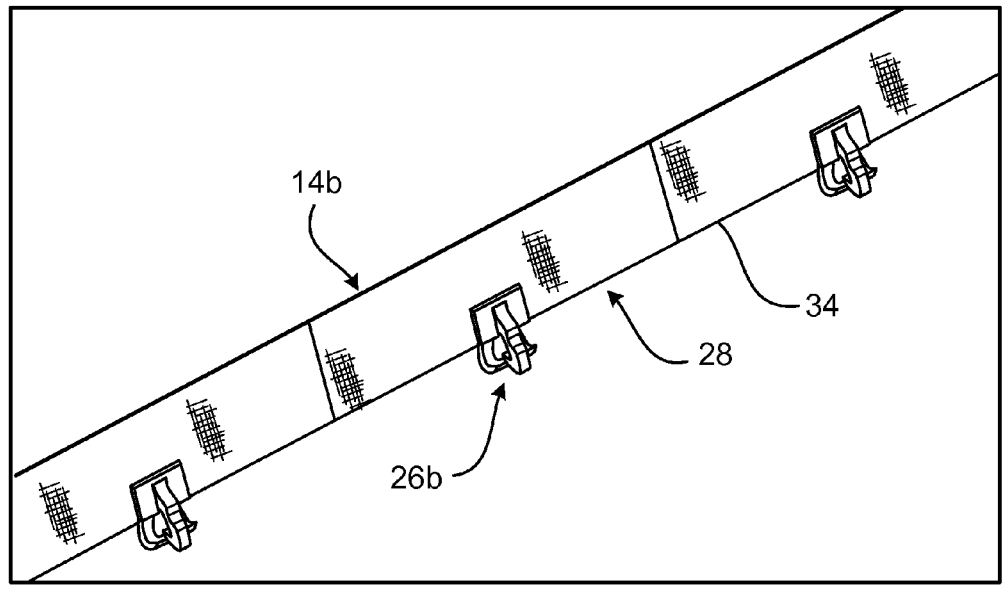
FIG. 4A is a perspective view of a seat trim cover featuring a one-piece clip attached to the end of a flexible web.
Figure 4B:
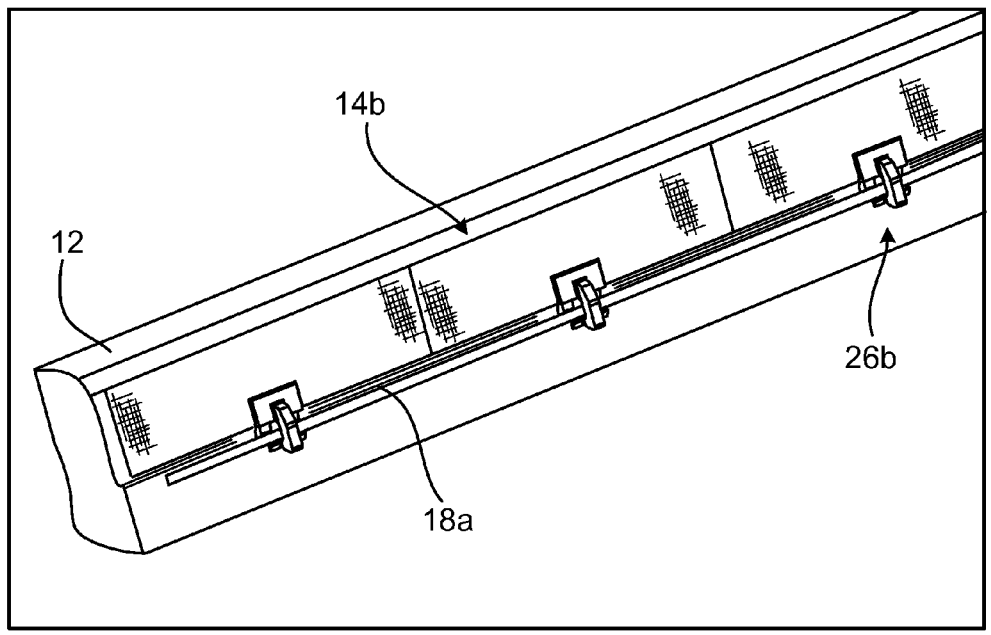
FIG. 4B is a perspective view of the seat trim cover of FIG. 4A coupled to a retainer.
Figure 4C:
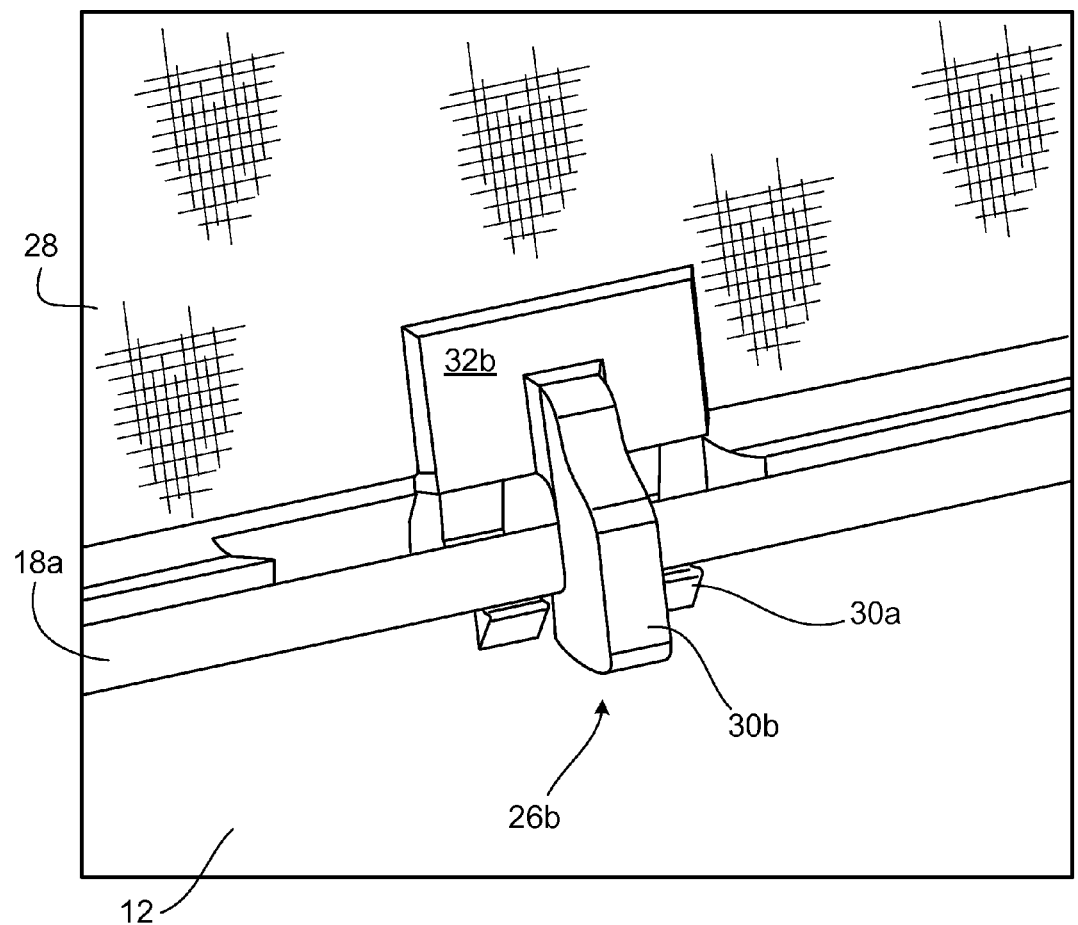
FIG. 4C is a close-up view of the one-piece clip of FIG. 4A installed on a retainer.

FIGS. 4A-4C illustrate the structure and function of a seat trim cover 14b featuring a series of one-piece clips 26b spaced apart along a flexible flange. Each of clips 26b includes a single base 32b over-molded onto the distal edge of cover flange 28 and extending from both sides of the flange. Base 32b supports two sets of latch elements 30a and 30b on either side of flange 28. Latch elements 30a and 30b are similar to the latch elements described above. The first set of latch elements 30a includes two discrete latch elements extending from a common base, while the second set of latch elements 30b includes a single latch element disposed between the other two latch elements. As used herein, a "set of latch elements" may refer to one or more latch elements. The sets of latch elements 30a and 30b are offset from one another (in this example by about five mm) and have heads that taper to distal tips on the opposite side the supporting flange 28. Thus, the opposing sets of latch elements 30a and 30b cooperate to define a closed groove in side profile for securely clasping the mating retainer 18a (see FIG. 4C). Base 32b may be formed by overmolding resin on both sides of the flange and merging two resin flows about the distal edge of the flange, with resin of the base encapsulating surface fibers on both sides of the flange. In some cases, apertures are provided through the flange at the point where the bases are to be formed, such that resin flows through the aperture during overmolding, to help secure the clips to the flange web.

FIGS. 5A-5D illustrate an example process for installing clip 26b on retainer 18a. In this example, clip 26b is installed on the retainer 18a by simultaneously pressing latch elements 30a and 30b down against the embedded wire retainer. As retainer 18a bears against the tapered cam surfaces 50 of latch heads 40, latch elements 30a and 30b flex outward at their necks away from the cover flange 28, opening the groove defined between them and allowing the retainer to enter the opened groove 48 as the clip continues to be pressed over the retainer. Each of latch elements 30a and 30b is formed with a flex point 47 to facilitate bending when retainer 18a is pressed against latch heads 40. In this example, the flex point is an area of thinner cross-section at the stem. As shown in FIG. 5D, when retainer 18a is secured in groove 48, latch elements 30a and 30b snap back into place, tightly clasping the retainer. The resin used to form the latch elements of this example is resilient enough to withstand the above-described flexing during installation.

In the example of FIGS. 6A-6D, a seat trim cover 14c features a series of three-piece clips 26c. Each clip 26c includes two sets of opposing latch elements 30a and 30b, with each of the latch elements beings supported on a separate base 32c over-molded onto a distal edge of the cover flange 28. Similar to clips 26b shown in FIGS. 4A-4C, the first set of latch elements 30a includes two latch elements, while the second set of latch elements 30b includes a single latch element. Similar to clips 26a shown in FIGS. 1A-1D, the rigid molded bases are spaced apart from one another along the length of the flexible cover flange, offsetting the latch elements. The latch elements themselves are shaped and dimensioned similar to those previously described.

Figure 6A:
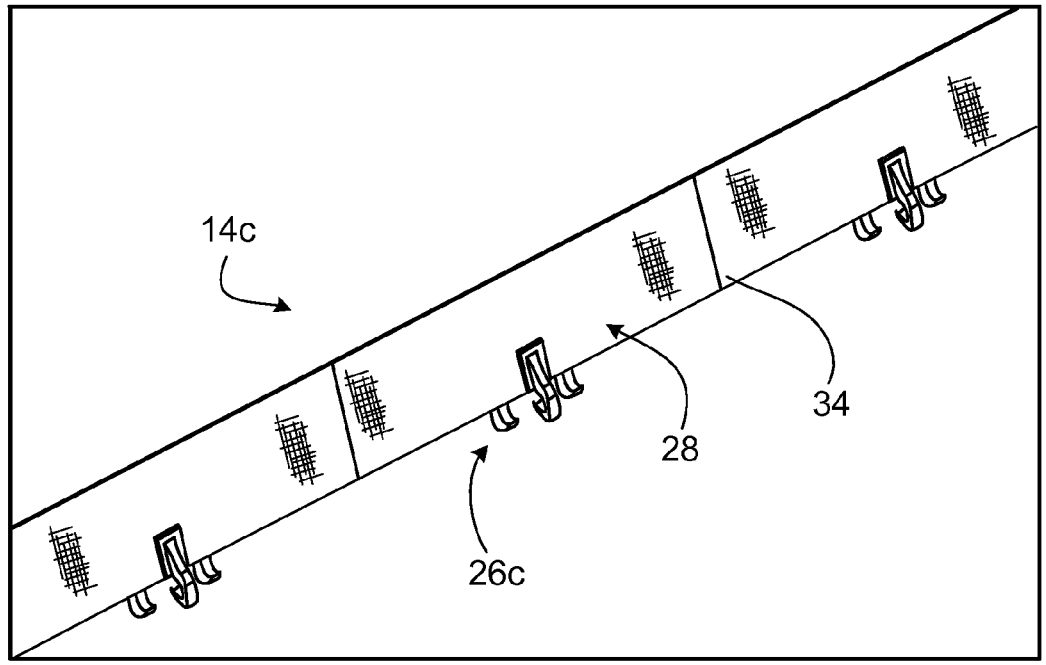
FIG. 6A is a perspective view of a seat trim cover featuring a three-piece clip attached to the end of a flexible web.
Figure 6B:
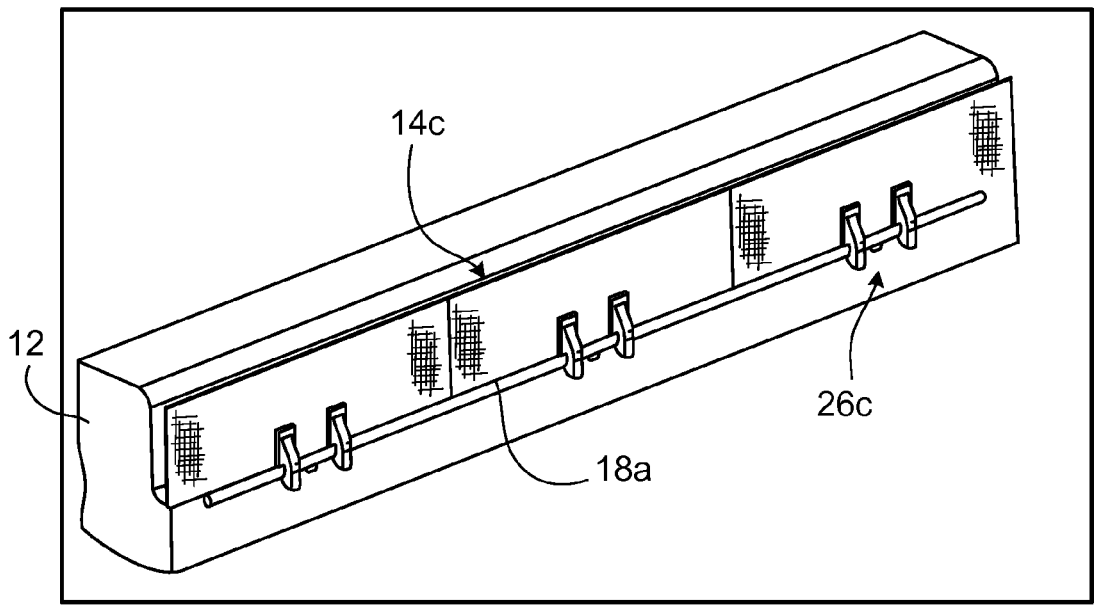
FIG. 6B is a perspective view of the seat trim cover of FIG. 6A coupled to a retainer.
Figure 6C:
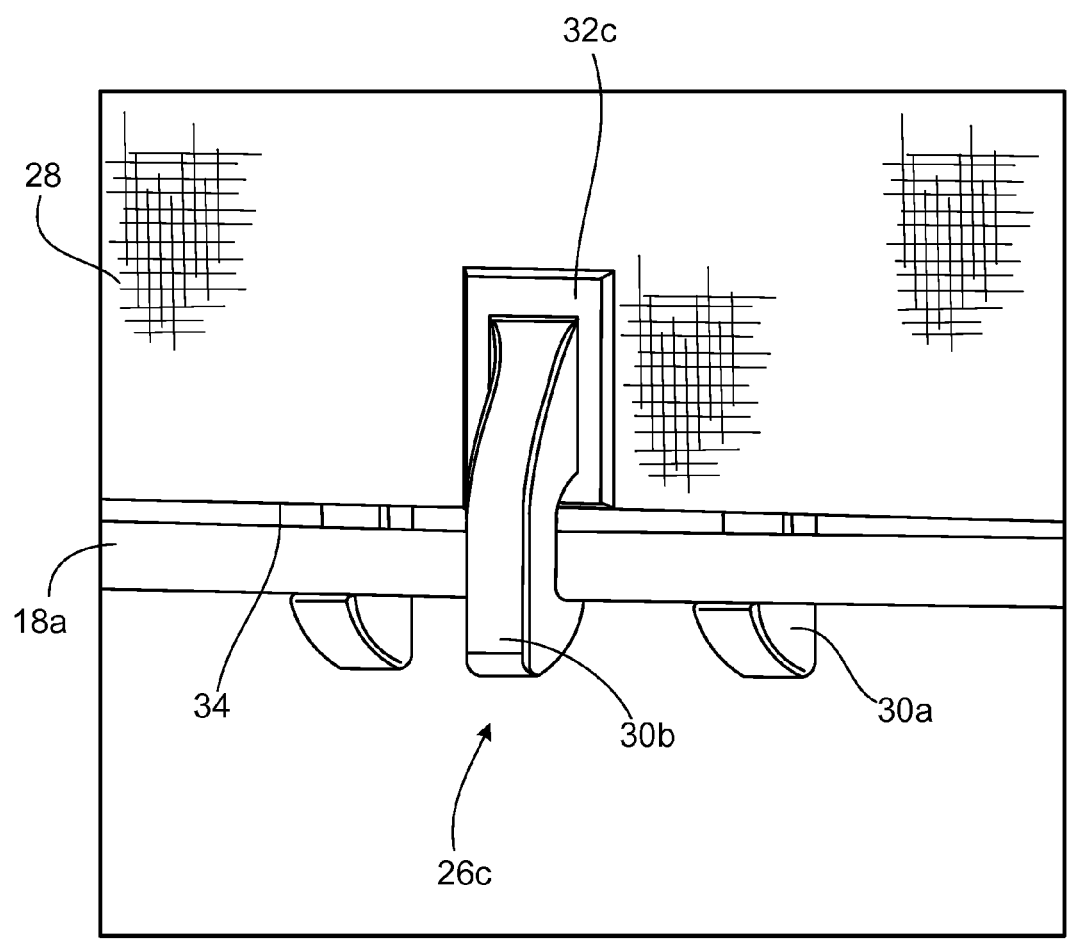
FIG. 6C is a close-up perspective view of the three-piece clip of FIG. 6A installed on a retainer.
Figure 6D:
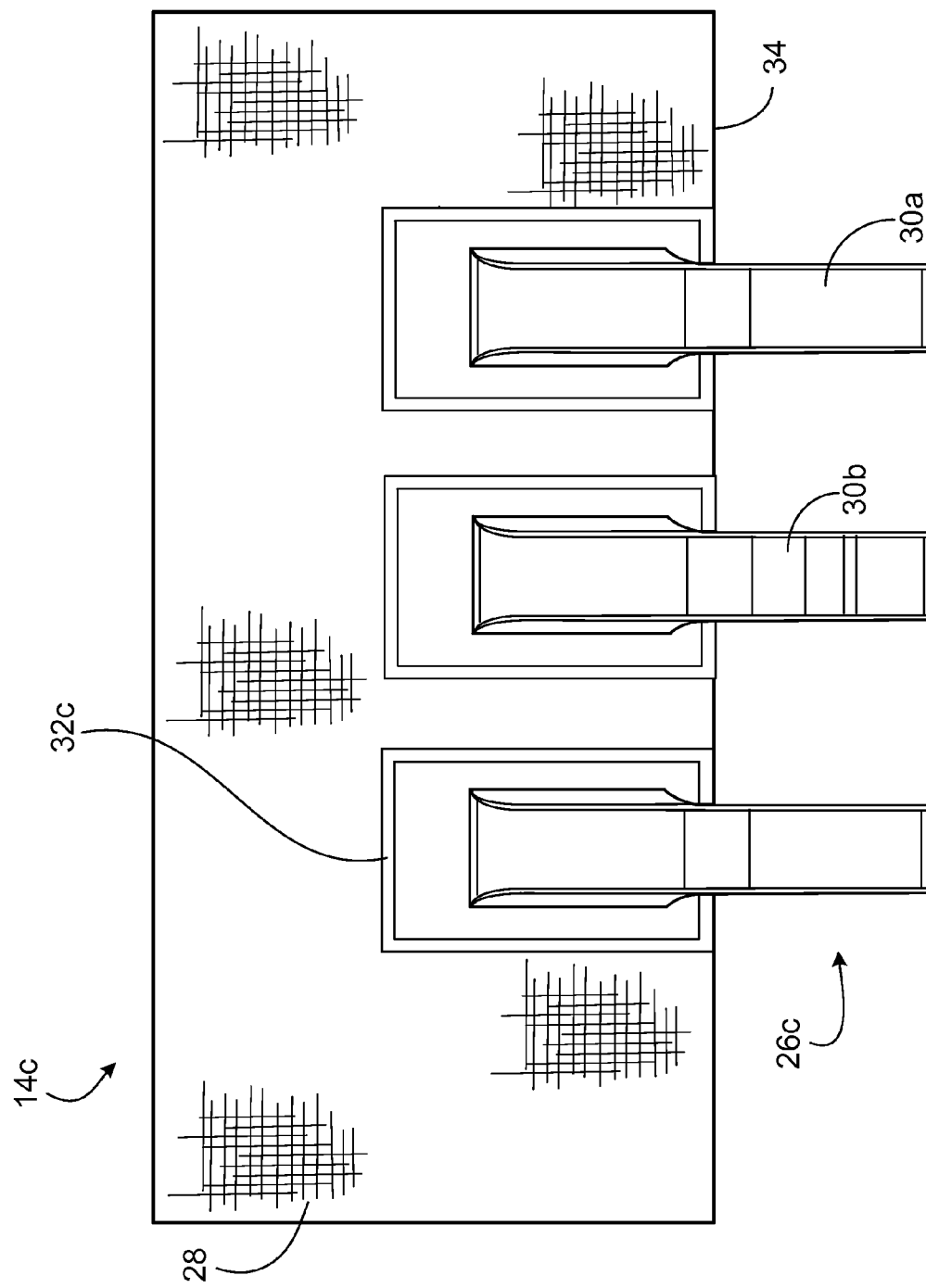
FIG. 6D is a close-up front view of the three-piece clip of FIG. 6A installed on a retainer.
Figure 6E:
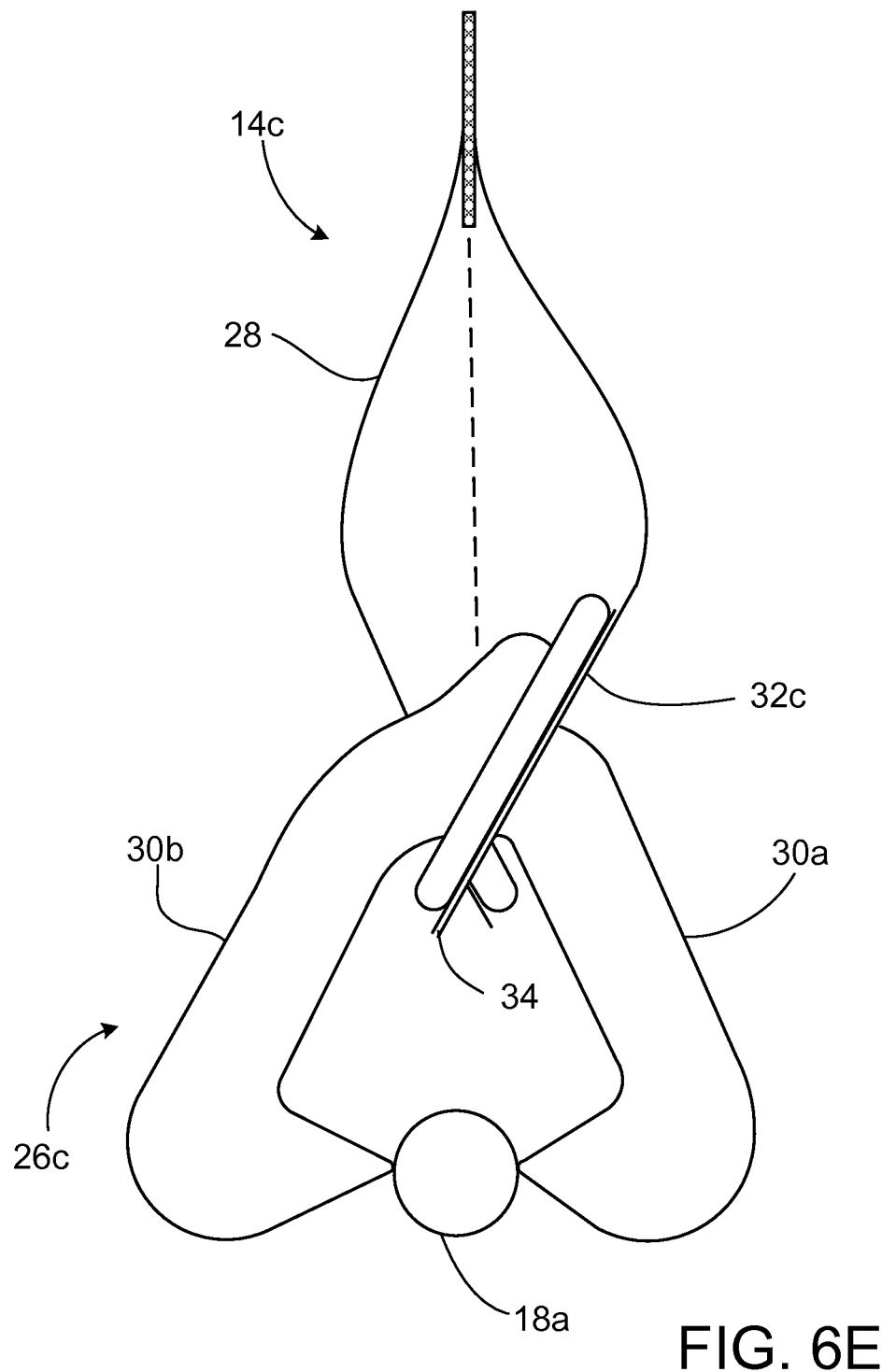
FIG. 6E is a side view illustrating installation of the seat trim cover of FIG. 6A.

Similar to previous examples, clips 26c can be installed on a retainer by simultaneously pressing the cam surfaces of the latch heads down against the retainer 18a. The retainer bears against the cam surfaces to force the opposing latch elements apart, allowing the retainer to enter the groove between them. However, as the individual bases 32c are connected to each other only via the flexible flange web, flexure of the flange material between the latch elements allows them to separate without significant flexure of the latch elements themselves. Rather, the portions of the web underlying the discrete bases 32c are moved out of the general plane of the flange during engagement, as shown in FIG. 6E. As an alternative method, clips 26c can be installed by individually engaging the latch elements to the retainer, using the flexibility of the flange material between separate bases 32c to maneuver and clasp the latch elements onto the retainer one at a time.

Turning next to FIGS. 7A-7F, a seat trim cover 14d features a series of two-piece clips 26d. Each of clips 26d includes two sets of opposing latch elements 30a and 30b, with each set of the latch elements being supported on a separate base 32d over-molded onto the cover flange 28 near its free edge. In this example, each set includes two latch elements. Similar to clips 26a and 26c described above, the rigid molded bases supporting each of the respective sets of latch elements of each clip 26c are spaced apart and connected only by the flange web. However, in this example, bases 32d are offset by a distance "$d_1$" along the length of the flexible cover flange, and spaced apart by a distance "$d_2$" along the height of the flange. As shown, the bases supporting the respective sets of latch elements do not overlap, leaving a region of flexible flange material between them. The offset distance "$d_1$" staggers the latch elements supported on the either side of the flange so that the latch elements on one side of the flange are offset and adjacent to latch elements on the opposing side of the flange. In this example, the latch elements are spaced apart by about one to two mm.

Figure 7A:
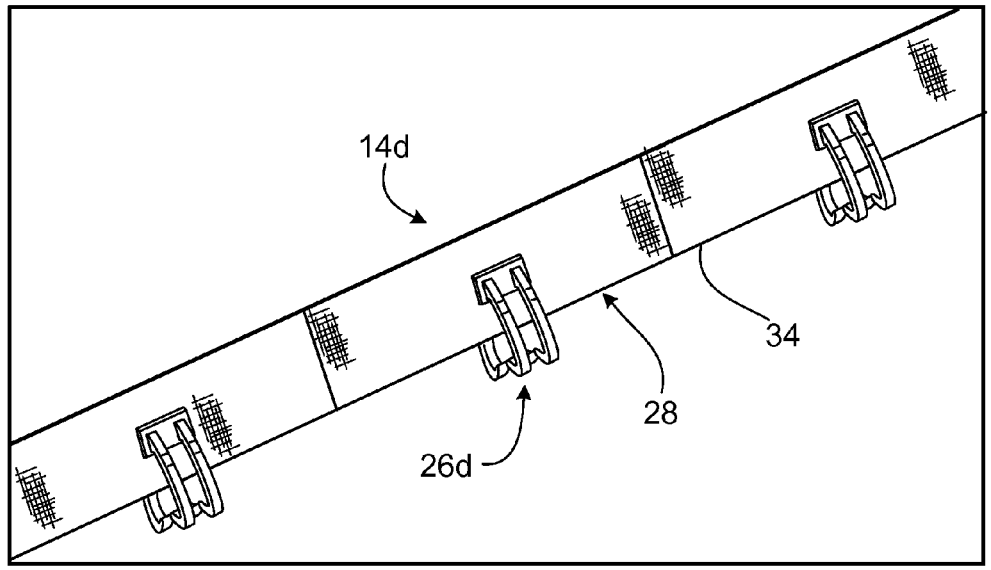
FIG. 7A is a perspective view of a seat trim cover featuring a two-piece clip attached to the end of a flexible web.
Figure 7B:
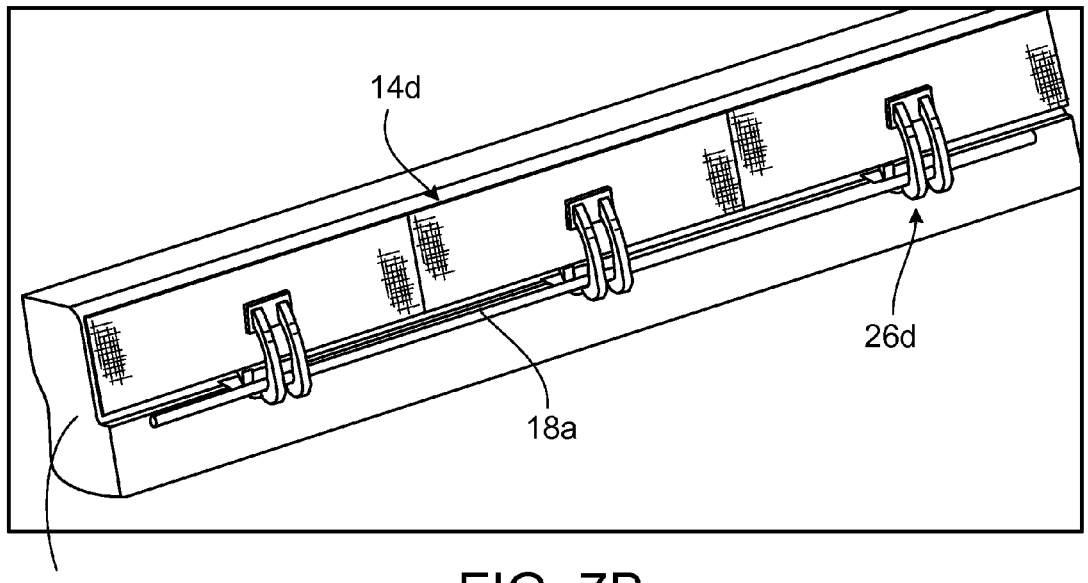
FIG. 7B is a perspective view of the seat trim cover of FIG. 7A coupled to a retainer.
Figure 7C:
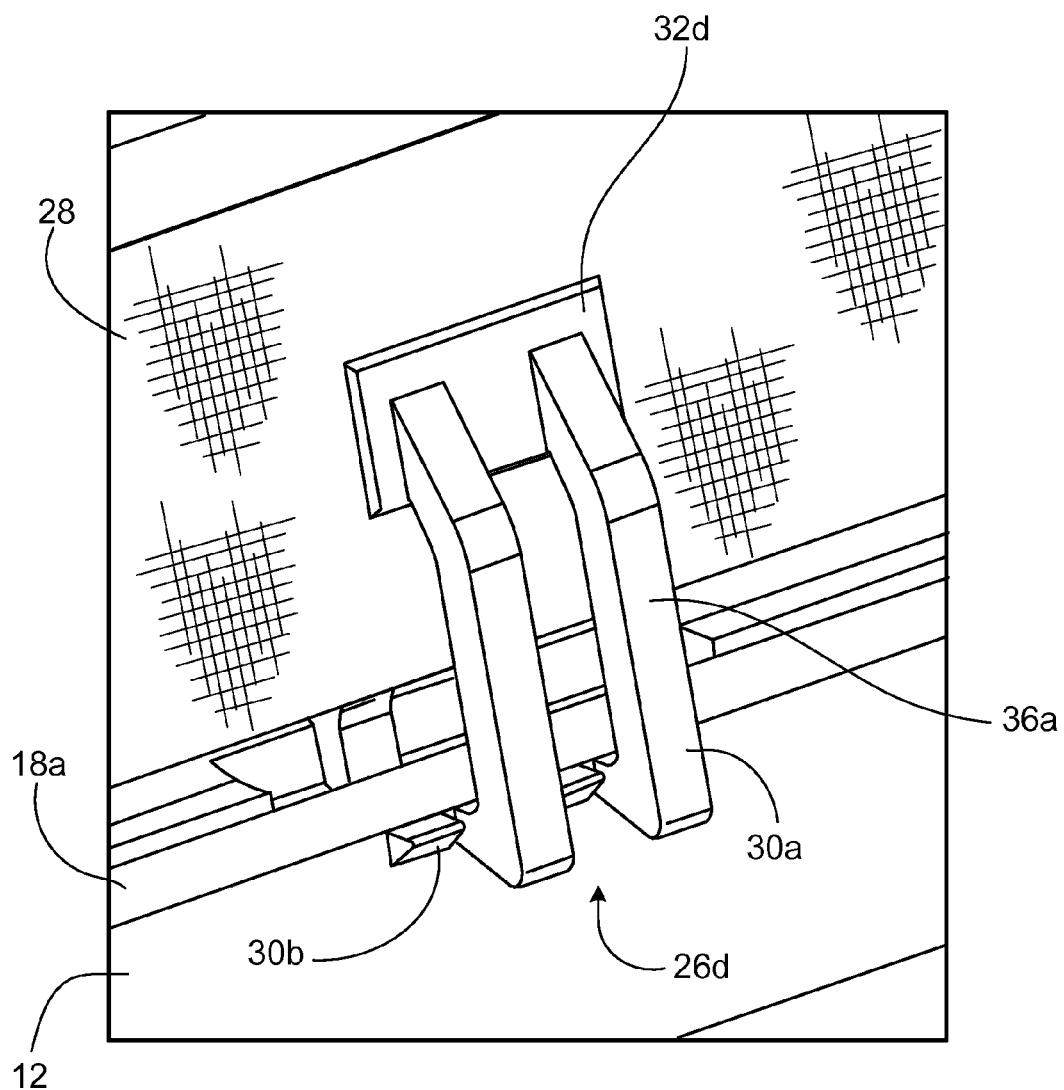
FIG. 7C is a close-up perspective view of the two-piece clip of FIG. 4A installed on a retainer.
Figure 7D:
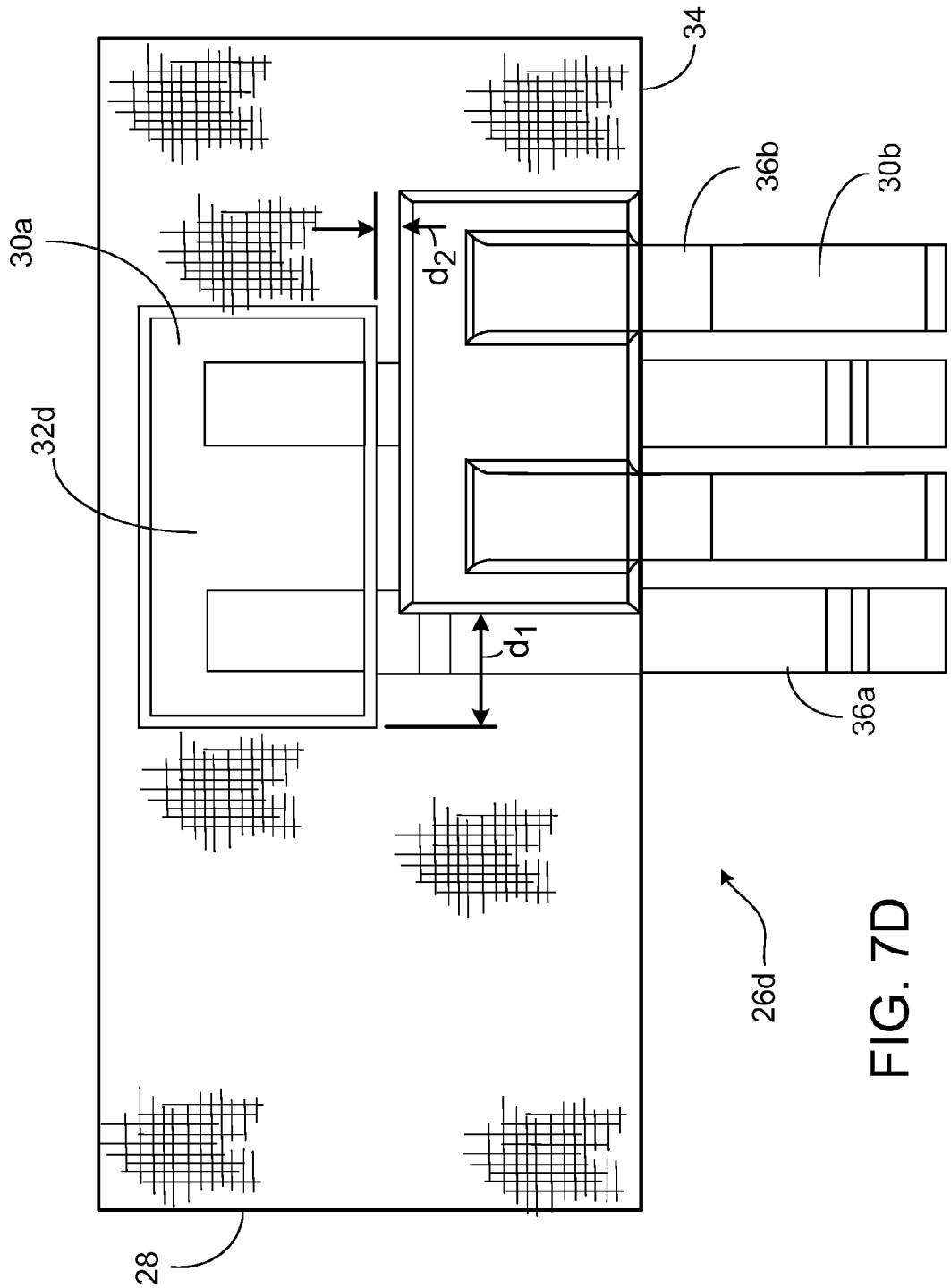
FIG. 7D is a close-up front view of the two-piece clip of FIG. 4A installed on a retainer.
Figure 7E:
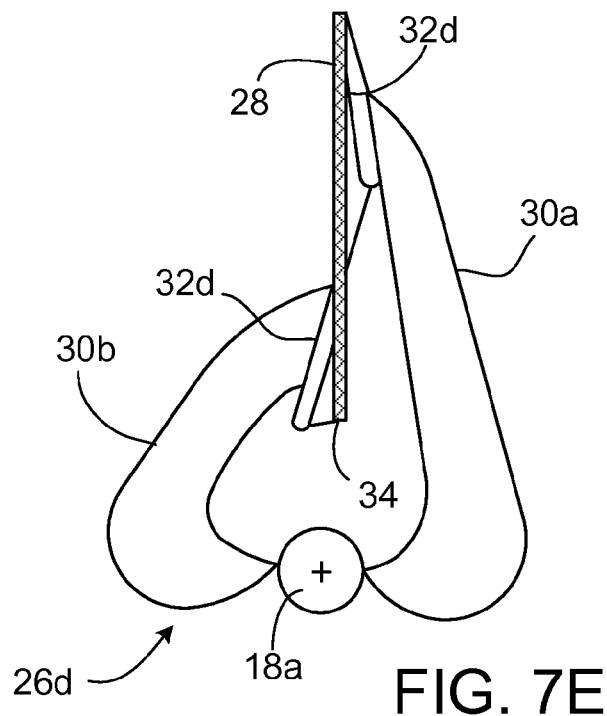
FIGS. 7E and 7F are progressive side views illustrating installation of the seat trim cover of FIG. 7A.
Figure 7F:
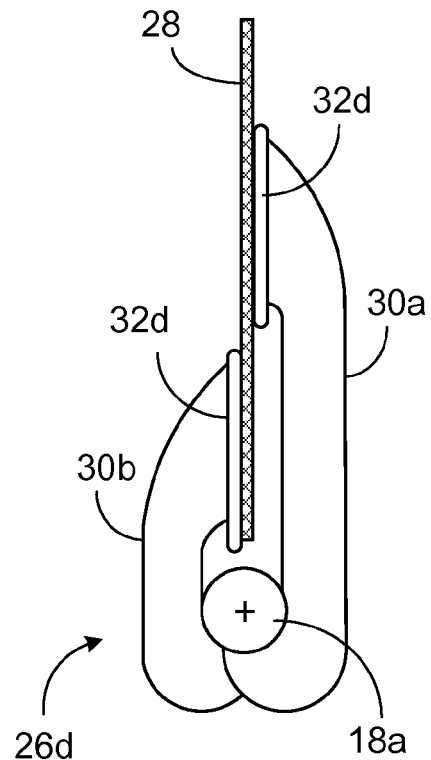

The latch elements themselves are similar to those previously described. However, in this example, the latch elements of the respective sets have different lengths to account for the difference in spacing of their bases from the flange edge 34 The first set of latch elements 30a have a longer stem 36a extending from the corresponding base 32d than the stem 36b of the second set of latch elements 30b. The heads of the respective sets of latch elements are in alignment below the flange so as to clasp the retainer as described above. Because of the spacing of the bases 32d in a direction perpendicular to flange edge 34, the flange may be flexed out of its plane as shown in FIG. 7E, to open the groove defined between the latch elements to receive retainer 18a. When snapped in place, the flange returns to its generally planar state, with the stems of the latch elements again extending generally parallel to one another and the retainer gripped between the latch elements, as shown in FIG. 7F.

For example, because of the stem supporting the head of the retainer, the heads of the latch elements may not extend as far, or the latch element stems may retain some bending strain when snapped in place, holding the heads against the retainer stem, or the cam surfaces of the latch heads may not be as deep, etc.

Figure 8:
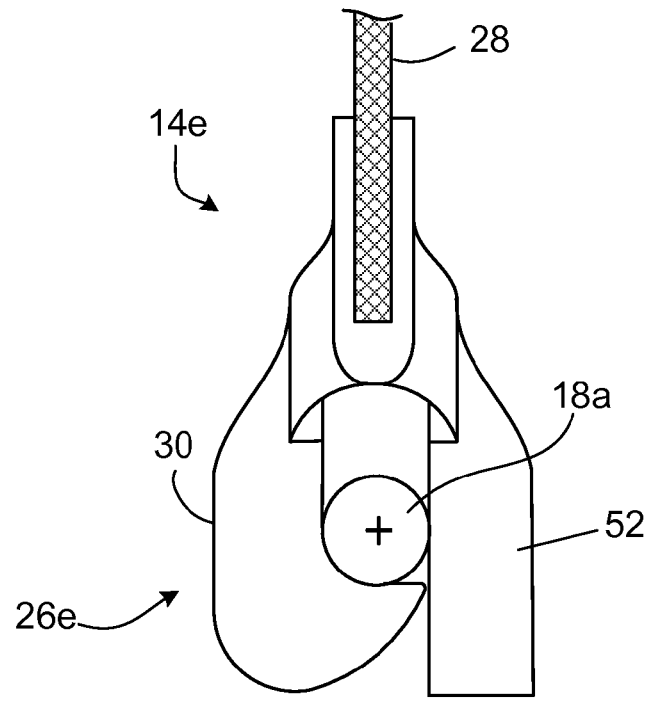
FIG. 8 is a side view of a seat trip cover including a clip featuring two different types of latch elements cooperating to secure a retainer.

Some previous examples have addressed clips with opposing latch elements that are substantially identical or very similar to one another. However, in some other examples the clips feature opposing latch elements that are of an entirely different design. Consider, for example, the clip of FIG. 8. In this example, the seat trim cover 14e features a series of clips 26e each of which includes a first latch element 30 that is similar to the latch elements described in connection with the embodiment of FIG. 2A-2D. Accordingly, the latch element 30 includes a stem extending integrally outward and downward from a supporting base, a neck extending integrally downward from the stem, and a crescent-shaped head extending integrally from the neck. In contrast to latch element 30, a second latch element 52 projects substantially straight downward from its supporting base on the flange. The inward projecting tip of latch element 30 interacts with the straight portion of latch element 52 to form a closed groove for securely clasping the retainer 18a. Various other embodiments with different types of opposing latch elements are also contemplated. For instance, in this example, the clips are a one-piece construction, but multi-piece clips are also envisioned.

Figure 9:
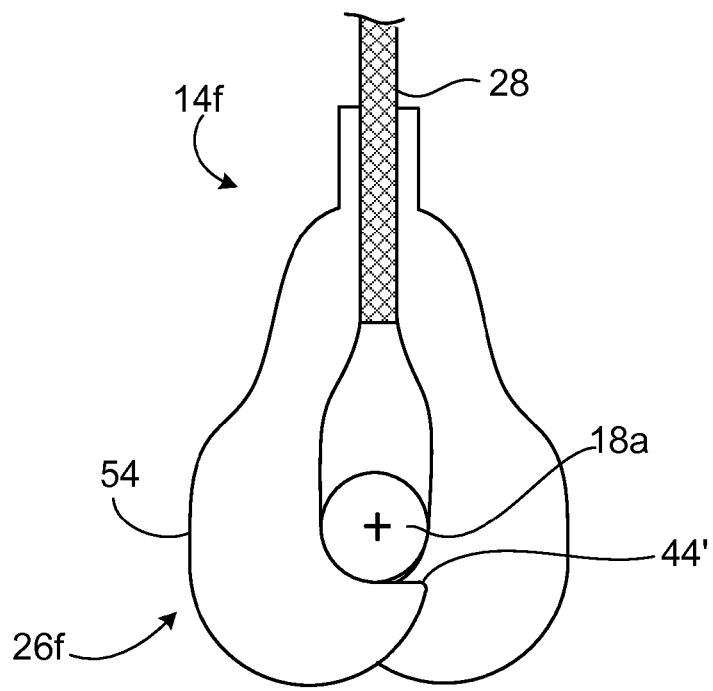
FIG. 9 is a side view of a seat trim cover including a clip featuring latch elements with reentrant tips that define inward facing crooks.

Some previous examples have addressed clips with latch elements having crescent-shaped heads with non-reentrant tips. FIG. 9, on the other hand, shows seat trim cover 14f features a series of clips 26f where the heads of the latch elements curve inward to terminate in reentrant distal tips 44'. The reentrant tips curve both inward, toward the opposing latch element, and upward, toward the base of the clip. Reentrant tips 44' form a crook 54 that "cradles" the retainer 18a. Crooks 54 cooperate to define the closed groove for securing retainer 18a.

Clips with reentrant distal tips can more securely hold the retainer, as compared to clips with non-reentrant tips. Yet clips with non-reentrant tips may be easier to form by conventional molding techniques. In some examples, the geometry of the heads with reentrant tips may require the clip to have more flexibility to facilitate installation. Thus, in this example of FIG. 9, the clip is a two-piece construction, with the flexible flange material extending between and connecting the relatively rigid latch members.

Figure 10:
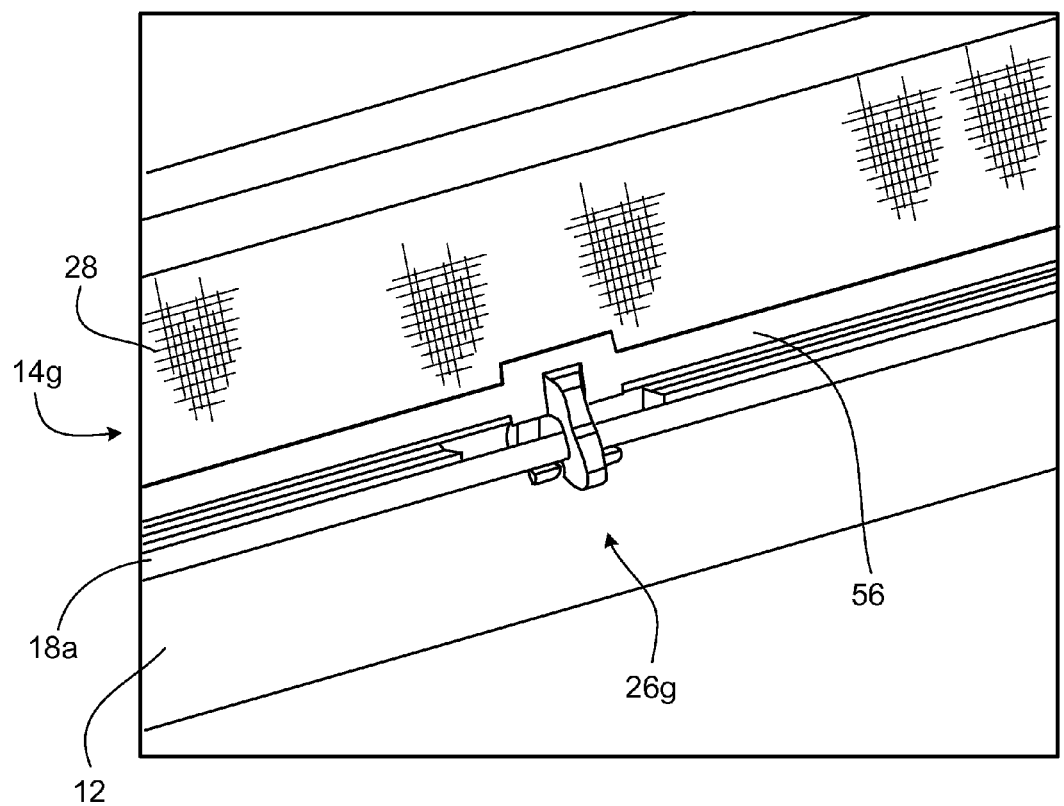
FIG. 10 is a perspective view of a seat trim cover featuring a one-piece clip attached to the end of a flexible web reinforced with a listing bead.

FIG. 10 illustrates a seat trim cover 14g featuring a series of one-piece clips 26g. The one-piece clips 26g are similar to those described above in connection with FIGS. 4A-4C. The respective clips 26g are connected to one another by a listing bead 56 running along the distal edge of the flange 28. Listing bead 56 can be over-molded to flange 28 in the same operation that forms clips 26g. The listing bead increases the rigidity of the flange 28 at its distal edge around the clips 26g, which makes the flange and clips easier to handle by a user during installation of seat trim cover 14g. In this example, because the clips are the one-piece type, the listing bead does not affect the flexibility of the individual clips. The listing bead can also be implemented in a multi-piece clip, for example, by only providing resin material to the areas of the flange between the clips, leaving the flexible flange material between the individual latch elements of the respective clips free of resin.

Figure 11A:
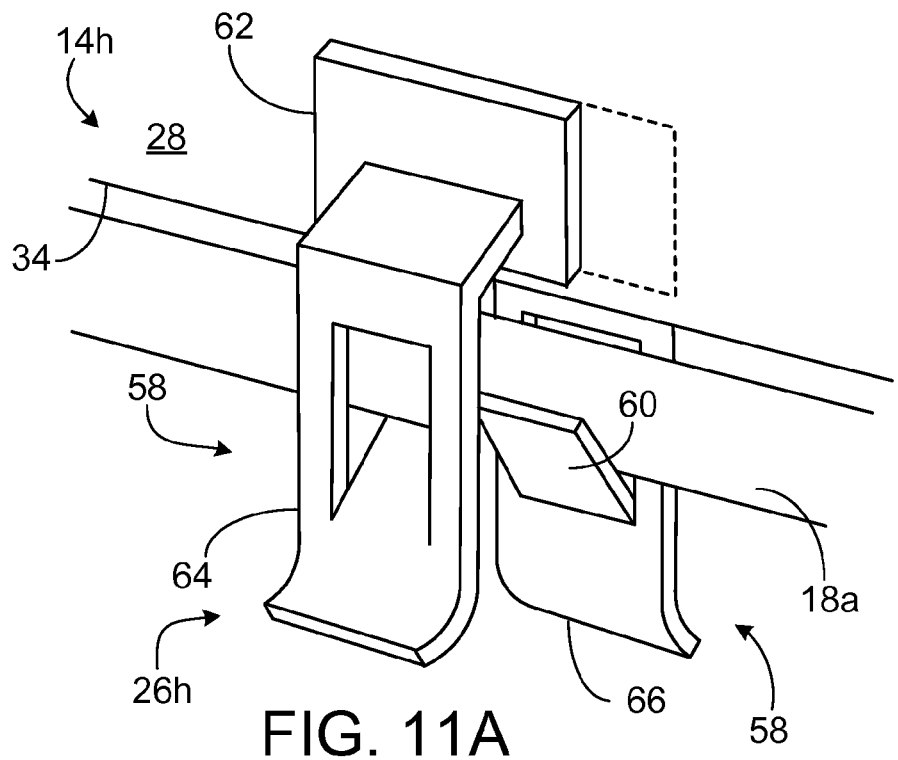
FIG. 11A is a perspective view of a seat trim cover including a clip featuring latch elements with resilient clasps.
Figure 11B:
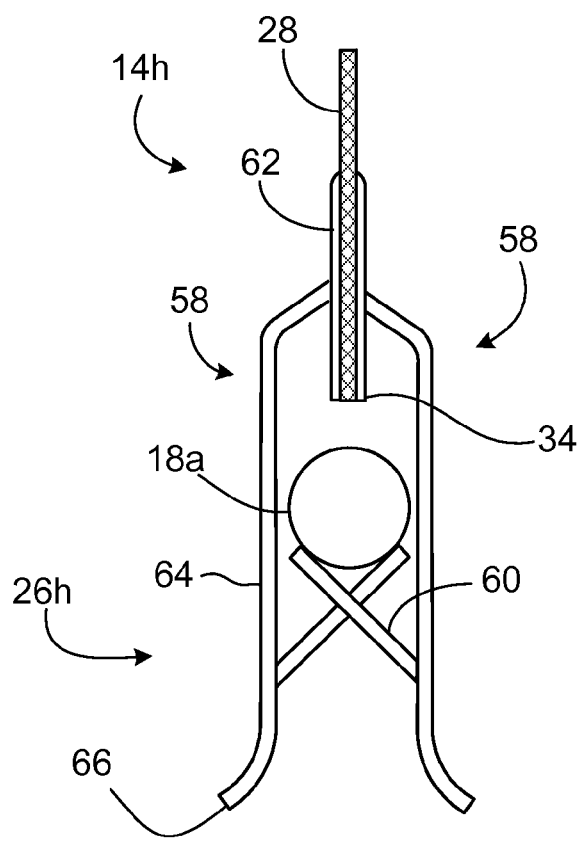
FIG. 11B is a side view of the seat trim cover of FIG. 11A.

Turning now to FIGS. 11A and 11B, a seat trim cover 14h includes a series of clips 26h featuring latch elements 58 with resilient clasps 60 that grip the retainer 18a. In this example, each of latch elements 58 include a base 62 over-molded on, or otherwise secured to, the distal edge 34 of the flange 28, and a head 64 that projects outward and down from the base. Head 64 includes a resilient clasp 60 directed toward the opposing latch element. As shown, the clasps may be in the form of beams cantilevered from lower edges at which they are connected at an opening through the head. This structure may be formed by molding, or by punching and bending the clasps out of the plane of their respective heads. Such latch elements may alternatively be formed of metal, with their bases either adhered to the sides of the flange, or connected through the flange. The bases 62 of opposing latch elements 58 are shown partially offset along the length of the flange, allowing clasps 60 to cross one another to secure retainer 18a in place. In this example, the distal portion of the heads 64 define an outwardly flaring lip 66 which helps locate clip 26h in relation to retainer 18a during installation.

Figure 11C:
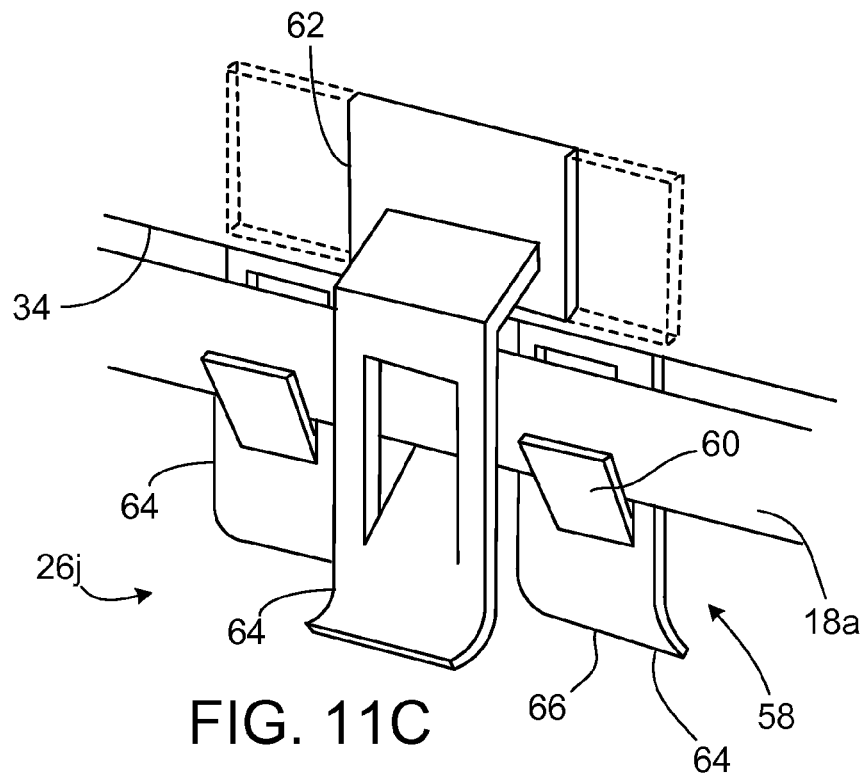
FIG. 11C shows a clip arrangement similar to that of FIG. 11A but with a different configuration of latch elements.
Figure 11D:
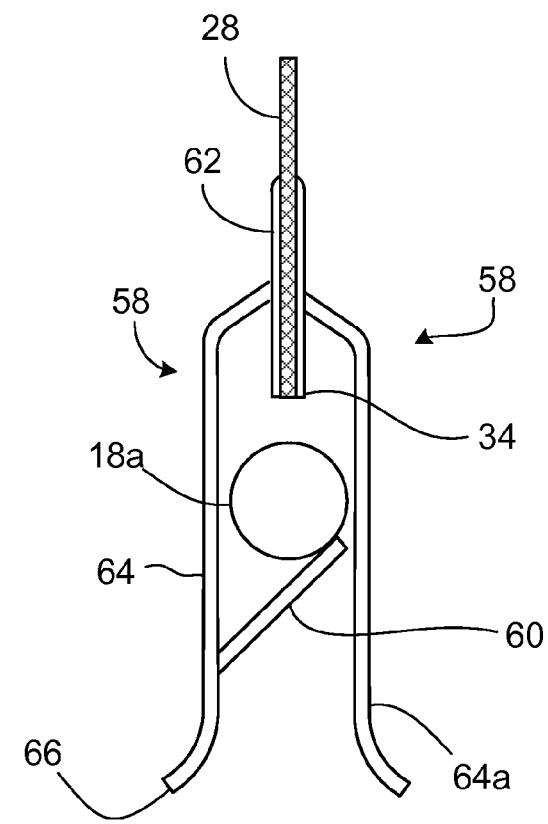
FIG. 11D is a side view of a further clip arrangement.

FIG. 11C shows a clip arrangement similar to that of FIG. 11A, but in which the latch element on one side of the web has a base that is shorter, in a direction along the length of the web, than the base of the latch element on the opposite side, from which extend two heads, one on each side of the head protecting from the shorter base. In this manner, the series of three alternating heads of the clip 26j together grasp the retainer 18a in the manner discussed above.

In the arrangement of 11D, only the head or heads 64 extending beyond the edge of the web on one side of the web feature clasps 60, while the head or heads 64a extending on the other side of the web have flat, featureless inner surfaces that serve to guide the retainer into engagement by the clasps, and can help to retain the retainer.

To install the seat trim cover, the clips are positioned above the retainer, with the retainer located between opposing latch elements. The clips are then pressed down against the retainer. The retainer bears against the resilient clasps of the latch elements, forcing them to deflect upwards until there is enough room for the retainer to slide therebetween. The deflected clasps then recover to their original position, trapping the retainer in place.

The use of terminology such as "front," "back," "upper," "lower," "over," "above," and "below" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

A number of embodiments of the invention have been described. Nevertheless, it will be understood that various modifications may be made without departing from the spirit and scope of the inventions.

What is claimed is:

1. A method of securing a seat trim cover to a foam cushion, the method comprising:
    placing a flexible seat trim cover adjacent a foam bun having a foam body outlined by a contoured outer surface, the foam bun carrying an elongated cushion retainer; and
    forcing each of a plurality of clips spaced-apart at predetermined intervals along a distal edge of a web of the seat trim cover into engagement with the cushion retainer, thereby simultaneously fastening and aligning the seat trim cover to the foam bun,
    wherein each of the plurality of clips comprises:
    opposing sets of one or more latch elements directly attached to opposite sides of the web, the opposing sets of latch elements being positioned offset from one another along a length of the distal edge of the web, forming a non-overlapping arrangement on the web.

2. The method of claim 1, wherein the opposing sets of latch elements are offset from one another by a distance less than the predetermined intervals between the clips.

3. The method of claim 1, wherein the cushion retainer is embedded in the foam bun beneath a floor of an elongated trench defined in the foam body, such that forcing the clips into engagement with the retainer comprises pushing the latch elements beyond the floor of the trench.

4. The method of claim 1, wherein each clip comprises two bases, each base secured to and extending from a respective side of the web and carrying at least one of the latch elements.

5. The method of claim 4, wherein the bases together form a unitary mass of solidified resin material.

6. The method of claim 4, wherein the bases are offset from one another along the length of the web.

7. The method of claim 4, wherein the bases are offset from one another by a distance in a direction perpendicular to the distal edge of the web.

8. The method of claim 4, wherein the bases are positioned in a non-overlapping manner with respect to a plane of the web, such that forcing the clips into engagement with the retainer comprises inducing a twist in the web.

9. The method of claim 1, wherein a first of the latch elements comprises: a base attached to a first side of the web; a neck extending from the base to beyond the distal edge of the web; and a head protruding from the neck toward a second side of the web.

10. The method of claim 9, wherein the head comprises a tapered cam surface at its distal edge, such as to help align the latch element and laterally deflect the latch element under pressure against the retainer.

11. The method of claim 1, wherein the web further comprises a listing bead reinforcing the distal edge of the web, the listing bead comprising solidified resin material over-molded along the distal edge of the web between spaced apart clips.

12. A method of securing a seat trim cover to a foam cushion, the method comprising:

placing a flexible seat trim cover adjacent a foam bun having a foam body outlined by a contoured outer surface, the foam bun carrying an elongated cushion retainer; and forcing each of a plurality of clips spaced-apart at predetermined intervals along a distal edge of a web of the cover into engagement with the with the cushion retainer, thereby simultaneously fastening and aligning the seat trim cover to the foam bun, wherein each of the plurality of clips comprises:

a first set of one or more latch elements, each latch element of the first set extending contiguously from one or more bases independently attached to a first side of the web; and a second set of one or more latch elements, each latch element of the second set extending contiguously from one or more bases independently attached to a second side of the web, wherein the one or more bases of the first set of latch elements attached to the first side of the web are spaced-apart on the web from the one or more bases of the second set of latch elements attached to the second side of the web, forming a non-overlapping arrangement and locating the first set of latch elements in an offset position along a length of the distal edge of the web relative to the second set of latch elements.

13. The method of claim 12, wherein the one or more bases attached to the first side of the web are spaced-apart on the web from the one or more bases attached to the second side of the web by a distance along the length of the web.

14. The method of claim 13, wherein the distance is less than the predetermined intervals between the clips.

15. The method of claim 12, wherein the cushion retainer is embedded in the foam bun beneath a floor of an elongated trench defined in the foam body, such that forcing the clips into engagement with the retainer comprises pushing the latch elements beyond the floor of the trench.

16. The method of claim 12, wherein the retainer is secured within an elongated trench defined in the foam body and comprises a longitudinally continuous rail with a bulbous distal edge, and wherein forcing the clips into engagement with the retainer comprises forcing the latch elements over the bulbous distal edge of the rail.

17. A covered foam cushion, comprising:

a foam bun having a foam body and a contoured surface outlining the foam body;

an elongated cushion retainer permanently secured to the foam bun; and a seat trim cover secured to at least a portion of the foam bun and comprising:

a flexible web; and a plurality of clips spaced-apart at predetermined intervals along a distal edge of the web, each of the clips comprising:

opposing sets of one or more latch elements directly attached to opposite sides of the web, the opposing sets of latch elements being positioned offset from one another along a length of the distal edge of the web, forming a non-overlapping arrangement on the web, wherein the latch elements of each clip clasp the cushion retainer at discrete sections along its length.

18. The cushion of claim 17, wherein at least one of the clips comprises a base secured to the distal edge of the web and carrying one or more of the latch elements.

19. The cushion of claim 18, wherein the base is over-molded onto the distal edge of the web.

20. The cushion of claim 19, wherein the base and the one or more latch elements comprise a molded unitary mass of solidified resin material.

21. The cushion of claim 17, wherein the opposing sets of latch elements are offset from one another by a distance less than the predetermined intervals between the clips.

22. The cushion of claim 17, wherein each of the clips comprises two bases, each base secured to and extending from a respective side of the web and carrying at least one of the latch elements, and wherein the bases are offset from one another along the length of the web.

23. The cushion of claim 22, wherein the bases together form a unitary mass of solidified resin material.

24. The cushion of claim 17, further comprising a listing bead reinforcing the distal edge of the web, the listing bead comprising solidified resin material over-molded along the distal edge of the web between spaced apart clips.

25. The cushion of claim 17, wherein at least one of the latch elements defines a hole having an edge from which an angled flap of the latch element extends across a plane of the web.

26. The method of claim 1, wherein at least one of the clips comprises a base secured to the distal edge of the web and carrying one or more of the latch elements.

27. The method of claim 26, wherein the base is over-molded onto the distal edge of the web.

28. The method of claim 27, wherein the base and the one or more latch elements comprise a molded unitary mass of solidified resin material.

* * * * *